United States Patent
Yuan et al.

(10) Patent No.: US 10,476,662 B2
(45) Date of Patent: Nov. 12, 2019

(54) METHOD FOR OPERATING A DISTRIBUTED KEY-VALUE STORE

(71) Applicant: City University of Hong Kong, Kowloon (HK)

(72) Inventors: Xingliang Yuan, New Territories (HK); Yu Guo, Shatin (HK); Xinyu Wang, New Territories (HK); Cong Wang, New Territories (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 81 days.

(21) Appl. No.: 15/483,052

(22) Filed: Apr. 10, 2017

(65) Prior Publication Data
US 2018/0294952 A1    Oct. 11, 2018

(51) Int. Cl.
| | |
|---|---|
| H04L 29/06 | (2006.01) |
| H04L 9/06 | (2006.01) |
| G06F 12/14 | (2006.01) |
| H04L 9/32 | (2006.01) |
| G06F 21/62 | (2013.01) |

(Continued)

(52) U.S. Cl.
CPC ............ H04L 9/06 (2013.01); G06F 12/1408 (2013.01); G06F 21/602 (2013.01); G06F 21/6227 (2013.01); H04L 9/0618 (2013.01); H04L 9/0894 (2013.01); H04L 9/3213 (2013.01); G06F 2212/1052 (2013.01)

(58) Field of Classification Search
None
See application file for complete search history.

(56) References Cited

U.S. PATENT DOCUMENTS

| | | |
|---|---|---|
| 9,037,860 B1 | 5/2015 | Kerschbaum et al. |
| 9,342,707 B1 | 5/2016 | Kerschbaum et al. |
| 9,425,960 B2 | 8/2016 | Kerschbaum et al. |

(Continued)

OTHER PUBLICATIONS

Jia, Liu et al. Efficient Identity-Based Ring Signature for RFID Authentication Scheme. 2010 IEEE International Conference on RFID-Technology and Applications. https://ieeexplore.ieee.org/stamp/stamp.jsp?tp=&arnumber=5529850 (Year: 2010).*

(Continued)

*Primary Examiner* — Jeremiah L Avery
(74) *Attorney, Agent, or Firm* — Renner Kenner Greive Bobak Taylor & Weber

(57) ABSTRACT

A method for operating a distributed key-value store includes processing a data set comprised of data records each associated with a unique identifier and having one or more values associated with one or more attributes using a private key provided at a client device, thereby partitioning each of the data records based on the identifier and forming a plurality of encrypted identifier-value pairs for distributed storage across a plurality of server nodes operably connectable to the client device. The method also includes building, at the client device, encrypted indexes based on the type of query; and executing a query protocol in response to receiving a query from the client device so as to identify, using the built encrypted indexes, data distributively stored in the server nodes which matches the query. The invention also provides a related system for operating a distributed key-value store.

18 Claims, 17 Drawing Sheets

(51) Int. Cl.
*H04L 9/08* (2006.01)
*G06F 21/60* (2013.01)

(56) References Cited

U.S. PATENT DOCUMENTS

| | | | |
|---|---|---|---|
| 9,712,320 B1* | 7/2017 | Kiayias | H04L 9/008 |
| 2008/0092239 A1* | 4/2008 | Sitrick | G06F 21/10 |
| | | | 726/27 |
| 2010/0114964 A1 | 5/2010 | Kerschbaum et al. | |
| 2010/0246827 A1* | 9/2010 | Lauter | G06F 21/6209 |
| | | | 380/278 |
| 2011/0055585 A1* | 3/2011 | Lee | H04L 9/0844 |
| | | | 713/183 |
| 2011/0264920 A1 | 10/2011 | Rieffel et al. | |
| 2012/0078914 A1 | 3/2012 | Roeder et al. | |
| 2012/0121080 A1 | 5/2012 | Kerschbaum | |
| 2013/0046974 A1 | 2/2013 | Kamara et al. | |
| 2014/0164758 A1 | 6/2014 | Ramamurthy et al. | |
| 2014/0351260 A1 | 11/2014 | Sundaram et al. | |
| 2016/0125198 A1 | 5/2016 | Hahn et al. | |
| 2016/0132692 A1* | 5/2016 | Kerschbaum | G06F 21/6227 |
| | | | 713/189 |
| 2017/0346851 A1* | 11/2017 | Drake | H04L 63/1466 |
| 2018/0218426 A1* | 8/2018 | Vaya | G06Q 30/0631 |

OTHER PUBLICATIONS

Han, Yi et al. The Design and Implementation of Key Server Data Store Based on Private Cloud Localization. 2016 2nd IEEE International Conference on Computer and Communications (ICCC). https://ieeexplore.ieee.org/stamp/stamp.jsp?tp=&arnumber=7924672 (Year: 2016).*

* cited by examiner

| ctL (00 10) | | |
|---|---|---|
| PRP | π(F2k2(null),00)→1 | π(F2k2(00),10)→2 |
| ctL | F3k3[''<''\|age\|\|1], F1k1(null\|\|1),1 | F3k3[''<''\|age\|\|2], F1k1(00\|\|2),2 |

| ctR (00 01) | | |
|---|---|---|
| 1 | 00=00 | +Q2{F1k1(null\|\|1),r1} |
| 2 | Q1[F3k3(10>00\|age\|\|2),c1]+Q2{F1k1(null\|\|2),r1} | Q1[F3k3(11>01\|age\|\|1),c1]+Q2{F1k1(00\|\|1),r1} |
| 3 | Q1[F3k3(11>00\|age\|\|3),c1]+Q2{F1k1(null\|\|3),r1} | Q1[F3k3(10>01\|age\|\|2),c1]+Q2{F1k1(00\|\|2),r1} |
| 4 | Q1[F3k3(01>00\|age\|\|4),c1]+Q2{F1k1(null\|\|4),r1} | 01=01 +Q2{F1k1(00\|\|3),r1} Q1[F3k3(00<01\|age\|\|4),c1]+Q2{F1k1(00\|\|4),r1} |

| ctR (00 11) | | |
|---|---|---|
| 1 | 00=00 | +Q2{F1k1(null\|\|1),r2} 11=11 +Q2{F1k1(00\|\|1),r2} |
| 2 | Q1[F3k3(10>00\|age\|\|2),c2]+Q2{F1k1(null\|\|2),r2} | Q1[F3k3(10<11\|age\|\|2),c2]+Q2{F1k1(00\|\|2),r2} |
| 3 | Q1[F3k3(11>00\|age\|\|3),c2]+Q2{F1k1(null\|\|3),r2} | Q1[F3k3(01<11\|age\|\|3),c2]+Q2{F1k1(00\|\|3),r2} |
| 4 | Q1[F3k3(01>00\|age\|\|4),c2]+Q2{F1k1(null\|\|4),r2} | Q1[F3k3(00<11\|age\|\|4),c2]+Q2{F1k1(00\|\|4),r2} |

Figure 4

METHOD FOR OPERATING A DISTRIBUTED KEY-VALUE STORE

TECHNICAL FIELD

The present invention relates to a method for operating a distributed key-value store and particularly, although not exclusively, to a method for operating an encrypted key-value store with rich queries.

BACKGROUND

A new group of distributed storage systems known as NoSQL data stores have rapidly emerged in the past decade for handling data in large-scale applications such as online gaming and product recommendations. Among various distributed storage systems, key-value (KV) stores are one of the most popular type of distributed data stores, due to their strength of performance as well as their scalability and fault tolerance. Exemplary key-value (KV) stores systems include Bigtable, Redis, DynamoDB, and RAMCloud. Recent advances on KV stores have made possible the utilization of secondary indexes to enrich their features, i.e., supporting multiple data models and enabling rich queries via attributes other than the primary key.

Against the backdrop of these advancements, and with frequent incidents of massive data breaches, privacy concerns are becoming increasingly serious with large volumes of data stored in distributed KV stores such as in public cloud or private data warehouses. Indeed, these distributed KV stores do not provide a strong protection for data confidentiality. Conventional security mechanisms for KV stores mainly rely on access control that specifies the access scope at user or group levels, or transparent server-side encryption that asks the servers (not the data owners) to encrypt data. These mechanisms cannot provide full protection against serious threats of data theft.

There is a need to provide a method and related system that can provide a more secure and efficient key-value (KV) store.

SUMMARY OF THE INVENTION

In accordance with a first aspect of the present invention, there is provided a method for operating a distributed key-value store, comprising: processing a data set comprised of data records each associated with a unique identifier and having one or more values associated with one or more attributes using a private key provided at a client device, thereby partitioning each of the data records based on the identifier and forming a plurality of encrypted identifier-value pairs for distributed storage across a plurality of server nodes operably connectable to the client device; building, at the client device, encrypted indexes based on the type of query; and executing a query protocol in response to receiving a query from the client device so as to identify, using the built encrypted indexes, data distributively stored in the server nodes which matches the query.

In one embodiment of the first aspect, the encrypted indexes are exact-match indexes which index the identifiers which respectively match the same value for a corresponding attribute.

In one embodiment of the first aspect, step (b) comprises tracking the values and recording a count for each of the values on the server nodes.

In one embodiment of the first aspect, step (b) utilizes a searchable symmetric encryption method.

In one embodiment of the first aspect, the method further comprises storing the encrypted indexes at the client device.

In one embodiment of the first aspect, the method further comprises storing the encrypted indexes in the plurality of server nodes.

In one embodiment of the first aspect, step (c) comprises: generating, at the client device, a token set with a plurality of tokens based on a condition attribute of the query; transmitting the token set to each of the plurality of nodes; processing the tokens at each of the plurality of nodes using local indexes associated with the respective node; providing one or more encrypted identifiers of encrypted matched records to the client device; decrypting, at the client device, the one or more encrypted identifiers; and generating, at the client device, labels for obtaining the matched values.

In one embodiment of the first aspect, the encrypted indexes are range-match indexes.

In one embodiment of the first aspect, step (b) comprises tracking the values, recording a count for each of the values on the server nodes, and tracking order information of the values.

In one embodiment of the first aspect, the order information is randomized.

In one embodiment of the first aspect, the method further step (c) comprises: generating, at the client device, a token set having a plurality of tokens based on a condition attribute of the query and one token containing encrypted order information; transmitting the token set to each of the plurality of nodes; processing the tokens at each of the plurality of nodes using local indexes associated with the respective node; providing one or more encrypted identifiers of encrypted matched records to the client device; decrypting, at the client device, the one or more encrypted identifiers; and generating, at the client device, labels for obtaining the matched value.

In one embodiment of the first aspect, the identifiers are stored in the form of ciphertext at the client;

In one embodiment of the first aspect, the identifiers are stored in the form of ciphertext in the plurality of server nodes.

In one embodiment of the first aspect, the method further comprises inserting dummy identifier-value pairs into the plurality of nodes.

In one embodiment of the first aspect, the method further comprises maintaining, at the client, a hashing ring which indicates the range of identifiers associated with each of the plurality of nodes.

In one embodiment of the first aspect, step (c) is performed in at least two batches for the data distributively stored in the server nodes.

In one embodiment of the first aspect, the server nodes are arranged in a cloud computing network.

In accordance with a second aspect of the present invention, there is provided system for operating a distributed key-value store, comprising: means for processing a data set comprised of data records each associated with a unique identifier and having one or more values associated with one or more attributes using a private key provided at a client device, thereby partitioning each of the data records based on the identifier and forming a plurality of encrypted identifier-value pairs for distributed storage across a plurality of server nodes operably connectable to the client device; means for building, at the client device, encrypted indexes based on the type of query; and means for executing a query protocol in response to receiving a query from the client device so as to identify, using the built encrypted indexes, data distributively stored in the server nodes which matches the query.

In one embodiment of the second aspect, the encrypted indexes are exact-match indexes which index the identifiers which respectively matches the same value for a corresponding attribute.

In one embodiment of the second aspect, the encrypted indexes are range-match indexes.

BRIEF DESCRIPTION OF THE DRAWINGS

Embodiments of the present invention will now be described, by way of example, with reference to the accompanying drawings in which:

FIG. 4 illustrates the operation of order-revealing encryption in accordance with one embodiment of the present invention;

DETAILED DESCRIPTION OF THE PREFERRED EMBODIMENT

Figure 2:
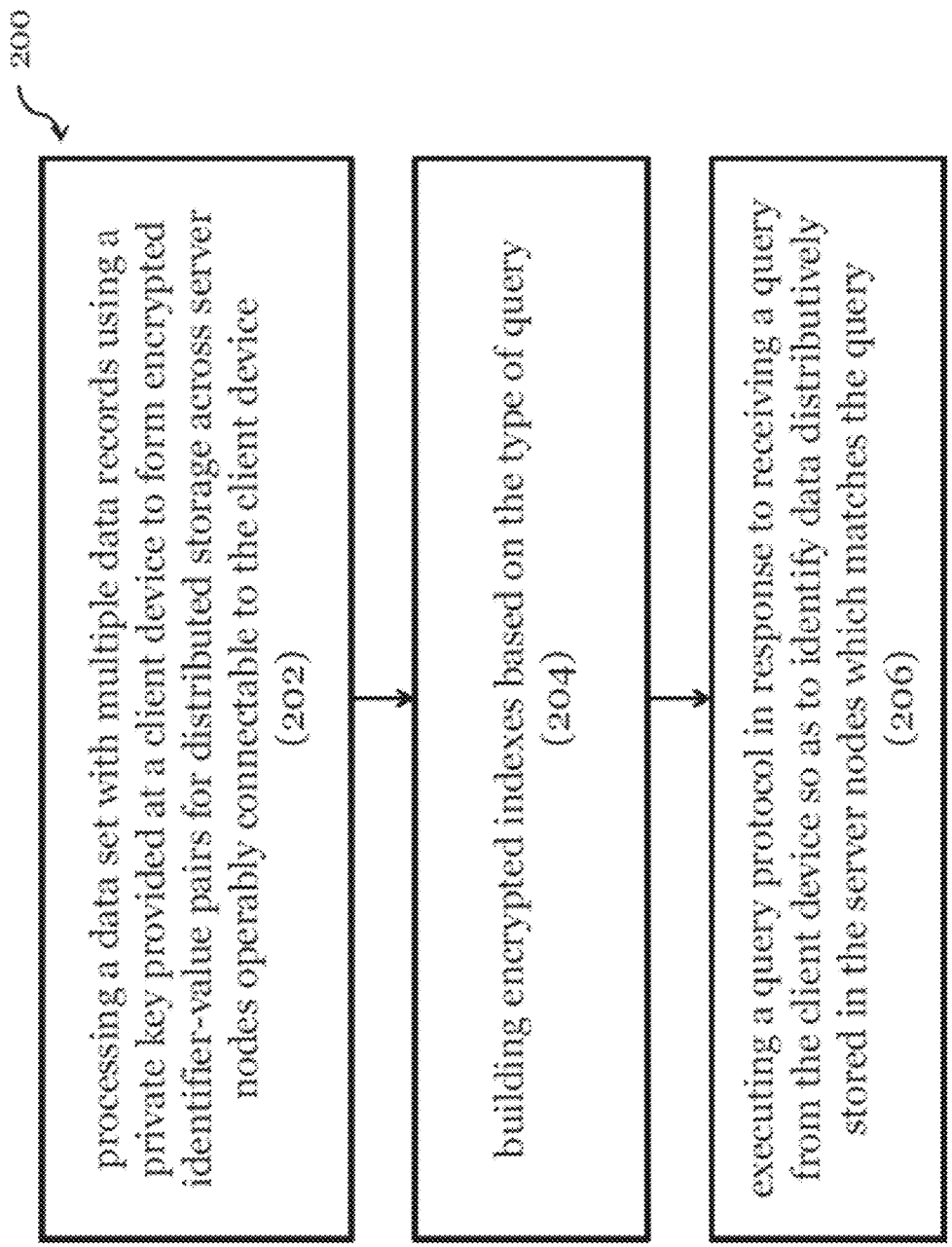
FIG. 2 is a flow diagram illustrating the basic steps in method for operating the encrypted key-value store (EncKV) of FIG. 1 in accordance with one embodiment of the present invention.

Referring to FIG. 2, there is disclosed a method 200 for operating a distributed key-value store in accordance with one embodiment of the present invention. The distributed key-value store may be an encrypted key-value store (EncKV) described in detail below. The method 200 includes, in step (202), processing a data set comprised of data records each associated with a unique identifier and having one or more values associated with one or more attributes using a private key provided at a client device, thereby partitioning each of the data records based on the identifier and forming a plurality of encrypted identifier-value pairs for distributed storage across a plurality of server nodes operably connectable to the client device. The method also includes, in step (204), building, at the client device, encrypted indexes based on the type of query; and, in step (206), executing a query protocol in response to receiving a query from the client device so as to identify, using the built encrypted indexes, data distributively stored in the server nodes which matches the query. Preferably, the encrypted indexes are exact-match indexes or range-match indexes; and the query protocol is an exact-match query protocol or a range-match query protocol. Embodiments of the present invention also provide a related system for operating a distributed key-value store.

Overview

System Architecture

Figure 1:
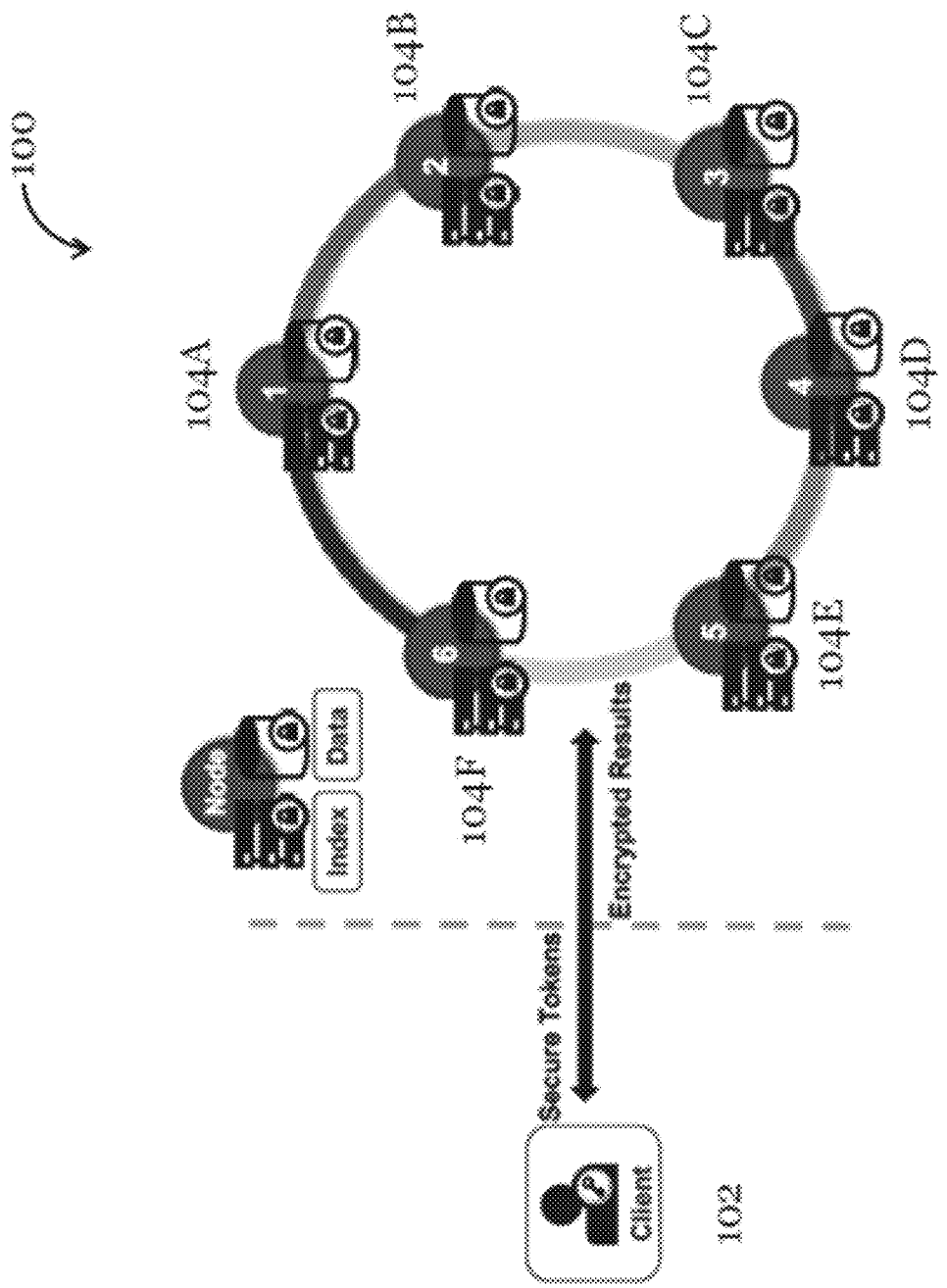
FIG. 1 is a schematic illustrating the system architecture of an encrypted key-value store (EncKV) in accordance with one embodiment of the present invention.

FIG. 1 shows the system architecture of EncKV in one embodiment of the present invention. As shown in FIG. 1, the system 100 includes a client device 102 (also referred to below as "client") and a number of server node devices 104A-104F (also referred to below as "server node(s)" or "node(s)") operably connectable with the client 102 for enabling bi-directional communication. In one example, the server nodes 104A-104F can be leased from the public cloud or be deployed at on-premise data centers. The connection between the client device 102 and server nodes 104A-104F may be through a wired or wireless communication link of the network. In the present embodiment, EncKV is particularly suited for clients 102 which store their sensitive data records in KV stores. The nodes 104A-104F are adapted to store encrypted data records and provide secure query services to the clients. Preferably, the client module 102 performs data encryption and decryption, encrypted index construction, as well as query token generation. The client module 102 also maintains the master key of the client, wherein the key is used to derive different private keys for the above functions. The nodes 104A-104F are arranged to handle query requests from the client 102. Each node 104A-104F is arranged to process query tokens over the encrypted indexes, and utilizes the APIs of the underlying KV stores to retrieve or get the encrypted data records.

In one embodiment, to insert a data record to EncKV, the client 102 has to utilize its private, preferably secured, key to generate encrypted label-value (LV) pair(s). If the data is formatted in rich data models other than the simple key-value model, then it will randomly be mapped into a set of encrypted LV pairs. This treatment allows EncKV in some embodiments of the invention to use a standard data partition algorithm (i.e., consistent hashing) for distributing encrypted pairs across the nodes.

For the purpose of building local indexes, EncKV in one embodiment may require the client 102 to maintain a small-sized consistent hashing ring which indicates the label range associated with each node. With the hashing ring, the client 102 can then directly insert LV pairs to targeted nodes 104A-104F. To retrieve data records via record identifiers, the client 102 generates corresponding labels for the targeted nodes 104A-104F.

To submit a secure query via secondary attributes of data, the client 102 first generates a token set from the query condition attribute, and then broadcasts the tokens to each of the nodes 104A-104F, respectively. Afterwards, each of the nodes 104A-104F processes the tokens on its local index, preferably simultaneously, and returns the encrypted record identifiers of matched records. Finally, the client 102 decrypts the record identifiers and generates labels to be transmitted to the corresponding nodes 104A-104F for fetching the encrypted result values.

In a preferred example, EncKV can allow dummy records to be inserted to mitigate inference attacks and leakage-abuse attacks. In a preferred embodiment, the query protocols of EncKV require two rounds of interaction. The first is to obtain the encrypted record identifiers, and the second is to fetch the matched results. This treatment facilitates an immediate security improvement to hide the associations between data values on different attributes. Again, in the present embodiment, the index framework of EncKV requires the client 102 to generate query tokens for all the nodes 104A-104F, and each of the nodes 104A-104F at least produces partial results.

Assumptions

In the present embodiment of EncKV, it is assumed that the client 102 is secure and trusted, i.e., it will not expose the keys to server nodes 104A-104F, and the keys are securely stored at the client 102. One embodiment of EncKV also assumes that the attackers will never have access to private keys of the client 102, although they can dump all the encrypted indexes and data records from server nodes 104A-104F. They can also monitor the query protocols and learn about the query tokens, accessed index entries, and encrypted result values. In one example, EncKV does not consider the case where attackers can access the background information about the queries and datasets, e.g., the partial (or entire) distribution or the content of queries or records. EncKV in the present embodiment also preferably does not consider the case where malicious attackers intentionally modify or delete the indexes and records.

Cryptographic Primitives

An embodiment of a symmetric encryption scheme (K Gen, Enc, Dec) contains three algorithms: The key generation algorithm K Gen takes a security parameter k to return a secret key K. The encryption algorithm Enc takes a key K and a value $v \in \{0,1\}^*$ to return a ciphertext $v^* \in \{0,1\}^*$; The decryption algorithm Dec takes K and $v^*$ to return v. Define a family of pseudo-random functions $F: \mathcal{K} \times X \to \mathcal{R}$, if for all probabilistic polynomial-time distinguishers Y, $|Pr[Y^{F(k,\cdot)} = 1 | k \leftarrow \mathcal{K}] - Pr[Y^g = 1 | g \leftarrow \{\text{Func}: X \to \mathcal{R}\}]| < \text{negl}$ (k), where negl(k) is a negligible function in k.

The ENCKV Design

The Underlying Encrypted KV Store

EncKV, in one embodiment of the present invention, is built based on an encrypted KV store illustrated in X. Yuan et al. *Building an encrypted, distributed, and searchable key-value store. In Proc. ACM AsiaCCS*, 2016. This prior design by the same inventor of the present invention has two main features. First, it proposes a secure data partition algorithm that dispatches encrypted data records across distributed nodes, while preserving horizontal scalability and fault tolerance. Second, it sketches an encrypted local index framework towards efficient queries via secondary attributes of data in distributed data stores.

The index designs of EncKV in the present invention are improved based on this framework for the practical performance of secure rich queries. Before introducing EncKV of the present embodiment in greater detail, a summary of the underlying encrypted KV store proposed in X. Yuan et al. *Building an encrypted, distributed, and searchable key-value store. In Proc. ACM AsiaCCS*, 2016 is provided.

Figure 3:
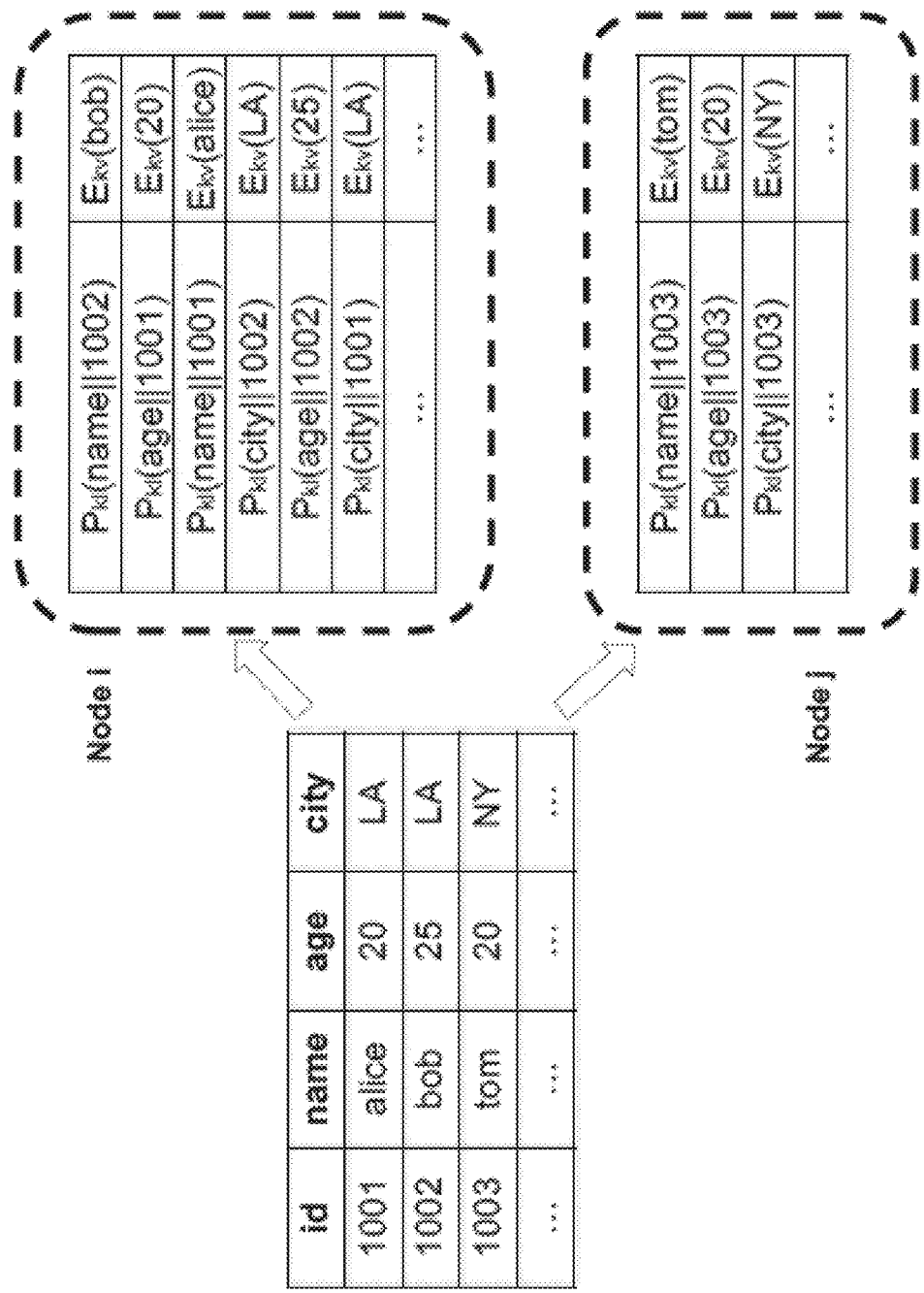
FIG. 3 shows a data structure in accordance with one embodiment of the present invention.

As an example, FIG. 3 illustrates the column-oriented data model in X. Yuan et al. It should be noted that other data models may also be supported. The core idea of the secure data partition algorithm in the present example is to map data records into encrypted label-value pairs. Specifically, each LV pair in EncKV is constructed as:

$$\langle P(k_l, C\|R), Enc(k_v, v) \rangle$$

$k_l$, $k_v$ are private keys, P is a secure pseudo random function (PRF), R is the record identifier, C is a column (secondary) attribute, v is a value on C, and Enc is a symmetric key encryption algorithm.

In X. Yuan et al. *Building an encrypted, distributed, and searchable key-value store. In Proc. ACM AsiaCCS*, 2016, $P(k_l, C\|R)$ is used as the label for partition. However, EncKV in the present embodiment uses the unique record identifier R instead to preserve the locality for queries via multiple attributes. As a result of this improvement, all the encrypted values for a given record are stored at the same node, and yet they are still fully scattered for protecting the schema and associations between the underlying values. In the present embodiment the record identifiers can be stored at either the client or server nodes in ciphertexts for system scaling.

Regarding the encrypted local index framework, the client in the present embodiment is required to maintain a consistent hashing ring so that it can trace the locations of values and build encrypted indexes that index the values stored on the same node. The benefits of maintaining such a hashing ring are two-fold: (1) Inter-node interaction can be avoided during the query process. Otherwise, if generic primitives are adopted, additional dedicated index nodes are needed to store the encrypted global indexes. 2) The nodes can process the queries in parallel, i.e., at the same time. Otherwise, one needs to add more index nodes and specifically design concurrent algorithms to improve the query latency and throughput in global indexes.

Exact-Match Index and Query Protocol
—Encrypted Index Design

---

Algorithm 1 Build$_{ext}$: build exact-match indexes

Input: Private Key $k_e$; secure PRFs {G1, G2, H1, H2}; values $\{v_1, \ldots, v_m\}$ on attribute C.
Output: Encrypted indexes $\{I_1^{ext}, \ldots, I_n^{ext}\}$.
  1: Initialize a hash table S to maintain counters;
  2: for $v_j \in \{v_1, \ldots, v_m\}$ do
  3:      i ← route(R); // R is $v_j$'s ID, i ∈ {1, n} is node ID
  4:      $t_1 \leftarrow G1(k_e, C\|v_j\|i)$;
  5:      $t_2 \leftarrow G2(k_e, C\|v_j\|i)$;
  6:      if S.find(i$\|$j) = ⊥ then
  7:          $c_i^j \leftarrow 0$;
  8:      else
  9:          $c_i^j \leftarrow$ S.find(i$\|$j);
10:      end if
11:      $\alpha \leftarrow H1(t_1, c_i^j)$;
12:      $\beta \leftarrow H2(t_2, c_i^j) \oplus Enc(k_R, R)$;
13:      $c_i^j$ + +;
14:      S.put(i$\|$j, $c_i^j$);
15:      $I_i^{ext}$.put($\alpha, \beta$);
16: end for

---

In the present embodiment, the construction of encrypted indexes in EncKV for secure exact-match queries is based on the SSE scheme illustrated in D. Cash et al. *Dynamic Searchable Encryption in Very Large Databases: Data Structures and Implementation. In Proc. NDSS*, 2014. The design in Cash uses KV pairs to index files that match the same keyword, with each file of the same keyword being distinguished by a stateful counter. EncKV in the present embodiment is built upon this idea—it indexes the record identifiers that match the same values on a certain column attribute. To integrate the design into the distributed local index framework, the client in EncKV is requested to track the values and maintain counters for each distinct value on different nodes during the index building procedure.

Algorithm 1 shows the detailed algorithm to index values $\{v_1, \ldots, v_m\}$ for a given column attribute C. The illustrated Algorithm is preferably executed at the client. In the present embodiment. For each $v_j$ for j from 1 to m, n counters are first initialized, where n corresponds to the number of nodes. The client then finds the target node i for $v_j$ based on the position of its record identifier R on the hashing ring. After that, the client generates two (or more) tokens by embedding the value securely via secure PRF, i.e., $t_1=G1(k_e, C_v\|v_j\|i)$ and $t_2=G2(k_e,C_v\|v_j\|i)$. The client further uses the corresponding counter to generate the encrypted index entry, i.e., $\langle \alpha=H1(t_1,c_i^j), \beta=H2(t_2,c_i^j)\oplus Enc(k_R,R)\rangle$, where R is securely indexed.

In the present embodiment, advantageously, only the index size is known to the nodes. In other words, without querying, no other information of the underlying content can be learned. In one embodiment, the counters will not be used in subsequent query protocols, and so they can be dropped if no records will further be added. To support incremental index updates, they can be stored either at the client or at the nodes in their encrypted form. Regarding performance, in the present embodiment, the query time is in linear relationship with the number of result values.

—Secure Query Protocol

---

Algorithm 2 Query$_{ext}$: secure exact-match query protocol

Input: Private key $k_e$; query condition value v; query condition attribute $C_v$; result value attribute $C_r$.
Output: Encrypted matched results $\{v_r\}$.
Client.Token
  1: for i ∈ {1, ... ,n} do
  2:     $t_1 \leftarrow G1(k_e, c_v\|v\|i)$
  3:     $t_2 \leftarrow G2(k_e, c_v\|v\|i)$
  4:     Send $(t_1, t_2)$ to node i;
  5: end for
Node$_i$.ExtQuery
  1: $c_i \leftarrow 0$;
  2: $\alpha \leftarrow H1(t_1, c_i)$;
  3: while find($\alpha$) ≠ ⊥ do
  4:     $\beta \leftarrow$ find($\alpha$);
  5:     $r \leftarrow I_i^{ext}$, get $(H2(t_2, c_j) \oplus \beta)$;
  6:     $c_i$ + +;
  7:     Return r to client for decryption
Client
  8:     $R \leftarrow Dec(k_R, r)$;
  9:     $l \leftarrow P(k_l, C_r\|R)$;
 10:     Fetch $v_r$ via l;
 11: end while
 12: // Note: in the implementation, all matched {r} are sent back in a batch, and $\{V_r\}$ are fetch in a batch.

---

The corresponding query protocol in the present embodiment is executed between the client and the nodes, as presented in Algorithm 2, following the index construction. In one embodiment, given a query via two attributes, the client may find all the values $\{v_r\}$ in attribute $C_r$ on the matching condition such that the value of another attribute $C_r$ should be the same as value v. First, the client generates query tokens for each node $\{t_1,t_2\}$, where $t_1=G1(k_e,C_v\|v\|i)$ and $t_2=G2(k_e,C_v\|v\|i)$. Preferably, each node processes these tokens in parallel. In particular, each node increments a counter $c_i$ to locate all the matched index entries via $H1(t_1,c_i)$ (until no entry is returned, and each entry is unmasked via XORing $H2(t_2,c_i)$ to get r the encrypted record identifier. After that, all matched {r} are sent back to the client for decryption. For each decrypted identifier R, the client generates the corresponding label via $P(k_l,C_r\|R)$ for fetching the encrypted result value.

In the present embodiment, data values and attributes are strongly protected during the query procedure. In particular, each node only learns the query tokens, accessed index entries, and encrypted result values. Due to the deterministic property of tokens, it also learns the repeated queries on the same attribute. The query protocol in the present embodiment requires two rounds of interaction between the client and each node. This arrangement is advantageous in that it can minimize the leakage of queries. Also, each node only learns the matched values associated to the same column, and it will not learn the associations between values in different column attributes, thereby effectively addressing inference attacks. Formal security analysis will provided below.

Range-Match Index and Query Protocol
—Encrypted Index Design

---

Algorithm 3 Build$_{rng}$: build range-match indexes

Input: Private key $k_r$, $k_o$; secure PRFs {G1, G2, H1, H3}; values $\{v_1, \ldots, v_m\}$ on attribute C.
Output: Encrypted indexes $\{I_1^{rng}, \ldots, I_n^{rng}\}$.
  1: Initialize a hash table S to maintain counters;
  2: for $v_j \in \{v_1, \ldots, v_m\}$ do
  3:     i ← route(R); // R is v's ID, i ∈ {1, n} is node ID
  4:     $t_1 \leftarrow G1(k_r, C\|i)$;
  5:     $t_2 \leftarrow G2(k_r, C\|i)$;
  6:     if S. find(i) = ⊥ then
  7:        $c_i \leftarrow 0$;
  8:     else
  9:        $c_i \leftarrow$ S. find(i);
 10:     end if
 11:     $\alpha \leftarrow H1(t_1, c_i)$;
 12:     $ct_R \leftarrow OREenc(k_o, v_j, c_i)$; // shown in Algorithm 4
 13:     $\beta \leftarrow H3(t_2, c_i) \oplus (ct_R\|Enc(k_R, R))$;
 14:     $c_i$ + +;
 15:     S.put(i, $c_i$);
 16:     $I_i^{rng}$.put($\alpha$, $\beta$);
 17: end for

---

The construction of encrypted range-match indexes in the present embodiment follows the same treatment as the encrypted exact matched indexes discussed above. For security reasons, each index entry has to be strongly encrypted, and the information on which entries associated with the same column attribute should also be hidden before querying. This objective is achieved in this example through searchable encryption techniques. For index and data locality, the client in EncKV is required to track the locations of data values. Algorithm 3 illustrates the index building procedure in one embodiment of the present invention. For each value $v_j$ on a column attribute C, the client first locates the node in which the record is stored. The client then generates the encrypted index entry $\langle \partial, \beta \rangle$ by securely embedding C and the counter $c_i$. It should be noted that the underlying content of β also contains the ORE ciphertext $c_{tR}$ which is computed from an enhanced ORE scheme to be introduced in the next section. As a result, the encrypted range-match index in the present embodiment is integrated into the local index framework of EncKV.

Enhanced ORE scheme: The basic concept of an ORE scheme proposed in K. Lewi and D. J. Wu. *Order-Revealing Encryption: New Constructions, Applications, and Lower Bounds. In Proc. ACM CCS*, 2016 is to split a message into bit blocks with equal length, and then conduct comparison from the significant least blocks of two messages. For example, if the message space is 4 bits, the block size is 2 bits, each message will then be encrypted into 2 blocks. Specifically, each block has total 22 possible values {00; 01; 10; 11}. The message block, say "10" to be encrypted, will be transformed to 4 sub blocks, where the order information {>, >, =, <} to each value above is securely embedded with its prefix block. In this example, the order cmp is defined as the output of the comparison CMP $(m_1, m_2)$ for block $m_1$ and $m_2$.

The inventors of the present invention note that the original ORE scheme may reveal or expose the order information between the query value and each ciphertext on the column. Such leakage is dangerous because it can tell partial order information between ciphertexts, i.e., some ciphertexts are smaller than or greater than others. Even the order can be one-way transformed as a pseudo-random tag, such tags would be sent along the queries, which can be used as frequency information for attackers if they know the query distribution. In short, security is compromised in the original ORE scheme.

To minimize the abovementioned leakage, the present embodiment protects order information by embedding it securely via PRF with the column attribute, the block index, and the stateful counter, as shown in Lines 7 and 8 of Algorithm 4. This forms the enhanced ORE encryption algorithm in one embodiment of the present invention. The sub block j in block i is encrypted as $Q1(s_{i,j}, c) + Q2|(F1(k_1, v_{|i-1}||j), \gamma)$, where $s_{i,j} = F3(k_a, CMP(j^*, v_{|i}))||C||j)$, $v_{|i}$ is the block value, $v_{|i-1}$ is the prefix block value, $C$ is the column attribute, and c is the counter of this value. j* is the securely permuted j in one of the possible values to this block, where $j \in [1, 2^b]$, b is the number of blocks.

This improved construction in the present embodiment guarantees that the order in each sub block is different, and the order conditions for different values are also different. Due to the deterministic property of PRF, the query comparison can still correctly be performed via token matching, as illustrated below.

—Secure Query Protocol

---

Algorithm 4 $ORE_{enc}$: enhanced ORE encryption

---

Input: Private key $k_o$; secure PRFs {F1, F2, F3}; secure PRP $\pi$; value v; counter c;
Output: ORE ciphertext $ct_R$
1: Derive $k_1, k_2, k_3$ from $k_o$ ;
2: Generate a nonce $\gamma$;
3: for i ∈ {1, b} do
4:  for j ∈ {1, $2^b$} do
5:   $j^* \leftarrow \pi^{-1}(F2(k_2, v_{|i-1}), j)$;
6:   if CMP($j^*, v_{|i}$) ≠ 0 then
7:    $s_{i,j} \leftarrow F3(k_3, CMP(j^*, v_{|i}))||C||j)$;
8:    $z_{i,j} \leftarrow Q1(s_{i,j}, c) + Q2(F1(k_1, v_{|i-1}||j), \gamma)$;
9:   else
10:   $z_{i,j} \leftarrow$ "equal" + $Q2(F1(k_1, v_{|i-1}||j), \gamma)$;
11:   end if
12:  end for
13:  $ct_{R|i} \leftarrow z_i, 1, \ldots, z_{i,2b}$;
14: end for
15: $ct_R \leftarrow \gamma, ct_{R|1}, \ldots, ct_{R|b}$;

---

Algorithm 5 OREcmp: ORE compare operation

---

Input: ORE query token $ct_L$; ORE ciphertext $ct_R$;
Output: true or false.
1: $\gamma, u'_1, \ldots, u'_b \leftarrow ct_R$;
2: $u_1, \ldots, u_b \leftarrow ct_L$;
3: for i ∈ {1, ... b} do
4:  $x_i, v_{|i}, q_i \leftarrow u_i$;
5:  $z_i, 1, \ldots, z_{i,2b} \leftarrow u'_i$;
6:  $s_i \leftarrow z_{i,v_{|i}} - Q2(x_i, \gamma)$;
7:  if $s_i \neq 0$ and $s_i = Q1(q_i, c)$ then
8:   return true; // condition matched
9:  end if
10: end for
11: return false;

---

Algorithm 6 $Query_{rng}$: secure range-match query protocol

---

Input: Private key $k_r, k_o$; query condition value v; order condition cmp ∈ {>, <}; query condition attribute $C_v$; result value attribute $C_r$.
Output: encrypted match results $\{v_r\}$.
Client.Token
1: for i ∈ (1, ... ,n} do
2:  $t_1 \leftarrow G1(k_r, c_v||i)$;
3:  $t_2 \leftarrow G2(k_r, c_v||i)$;
4:  for i ∈ {1, b} do
5:   $v_{|i} \leftarrow \pi(F2(k_2, V_{|i-1}), v_{|i}))$;
6:   $q_i \leftarrow F3(k_3, cmp||C|| v_{|i})$;
7:   $u_i \leftarrow F1(k_1, v_{|i-1}||v_{|i}),$   $v_{|i}, q_i$;
8:  end for
9:  $ct_L \leftarrow (u_1, \ldots, u_b)$;
10:  Send $(t_1, t_2, ct_L)$ to node i;
11: end for $Node_i$, RngQuery
1: $c_i \leftarrow 0$;
2: $\alpha \leftarrow H1(t_1, c_i)$;
3: while find($\alpha$) ≠ ⊥ do
4:  $\beta \leftarrow$ find($\alpha$);
5:  $r \leftarrow I_i^{rng}$, get (H3 $(t_2, c_i) \oplus \beta$);
6:  Parse r as $r_x \leftarrow Enc(k_R, R), r_y \leftarrow ct_R$;
7:  $c_i$ ++;
8:  // ORE compare operation shown in Algorithm 5
9:  if ORE cmp $(ct_L, ct_R)$ = true then
10:   Return $r_x$ to the client;
11:  end if
12: end while
13: // Note: we ignore the steps to fetch final results, which is the same in Line 7 to 10 in Algorithm 2.

---

Based on the index construction, the range match query protocol in one embodiment of the present invention is presented in details in Algorithm 6. In one example, given a query via two attributes, the client wants to find all values $\{v_r\}$ in attribute $C_r$ on the matching condition such that the value of another attribute $C_v$ should be smaller than value v. Similar to the exact-match query in one embodiment of the invention, the client generates query tokens for each node $\{t_1, t_2\}$ from $C_v$. For ORE comparison, the client needs to compute another token $ct_L$ which contains the encrypted blocks $(u_1, \ldots, u_b)$ with distinct encrypted order condition $q_i$ of each block. Preferably, each node processes $\{t_1, t_2\}$ in parallel, i.e., unmasking the corresponding ORE index entries via incremental counters. Afterwards, each node calls the ORE compare operation OREcmp to compare $ct_L$ and $ct_R$ in each entry above, as presented in Algorithm 5. The process is conducted from the most significant block. Symmetric to the block encryption, the encrypted order is obtained via $s_i = z_{i, v_{|i_s}} - Q2(x_i, y)$, where $z_{s, v_{i_s}}$ is the block of $ct_R$, $x_i$ is the corresponding block of $ct_L$, and is the nonce of this ciphertext. With the encrypted query condition $q_i$, $Q1(q_i, c)$ can be computed via counter c to check whether it is matched to $s_i$. If it is determined to be matched, the encrypted record identifier will be sent to the client to fetch the final result values on attribute $C_r$.

It should be noted that the design in the present embodiment has revealed the equality of the query value and the ciphertexts, and has indicated the position of the first block in which two values differ, which is the same to the adopted ORE scheme in K. Lewi and D. J. Wu. *Order-Revealing Encryption: New Constructions, Applications, and Lower Bounds. In Proc. ACM CCS,* 2016.

The query time complexity in the current treatment is $O(m_C)$, where $m_C$ is the number of values on attribute C at a certain node. The performance can further be improved by sorting values before encryption. Then the client notifies $m_C$ to this node for binary search.

Secure Rich Query Instantiation

The encrypted indexes in EncKV of the present embodiment readily enable rich queries supported in existing NoSQL data stores. These stores implement SQL-like query language for easy data management. SQL-like query examples will be used below to introduce how EncKV in the embodiment of the present invention supports rich queries.

Figure 5A:
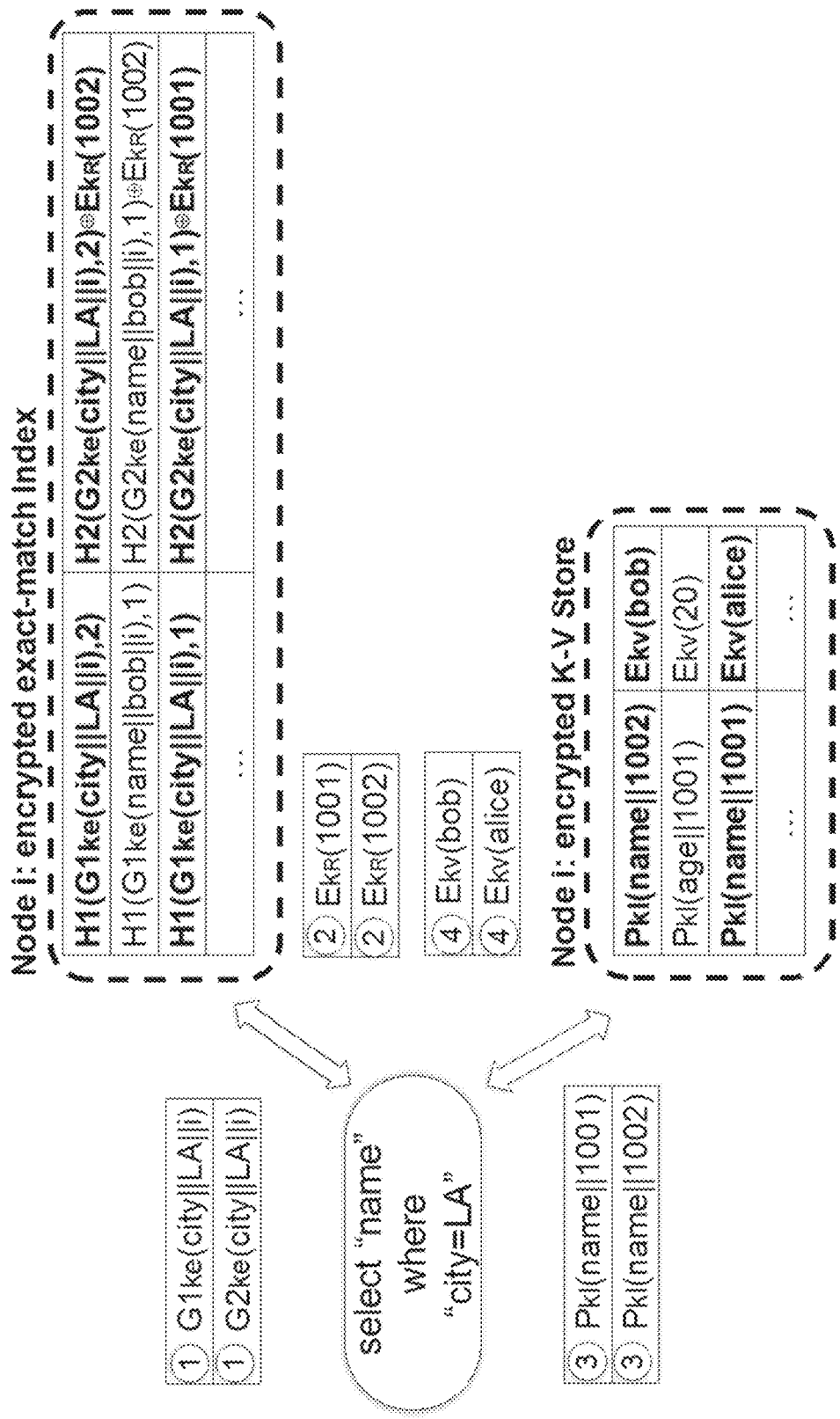
FIG. 5A illustrates the operation of a secure query protocol for an exact match query in accordance with one embodiment of the present invention.

Keyword Search, Equality and Count queries: Given a keyword search or equality query "SELECT name WHERE city=LA" in FIG. 5A, the client first generates a pair of tokens $\{t_1, t_2\}$ for each node based on the keyword condition "city=LA", where $t_1=G1(k_e,city\|LA\|i)$, $t_2=G2(k_e,city-\|LA\|i)$, and i is the node identifier. Then, each node processes these tokens in parallel. Specifically, all the matched index entries will be located via $H1(t_1,c_i)$ in node i, where $c_i$ is a counter. The encrypted record identifier $(Enc(K_R,1001)$ and $Enc(K_R,1002))$ after XORing $H^2(t_2,c_i)$ will be returned. Finally, the client decrypts them and obtains the encrypted result values via labels $P(k_f,name\|1001)$, $P(k_f,name\|1002)$. Regarding count queries, the client needs to count the values returned from each node, and aggregate the numbers.

Figure 5B:
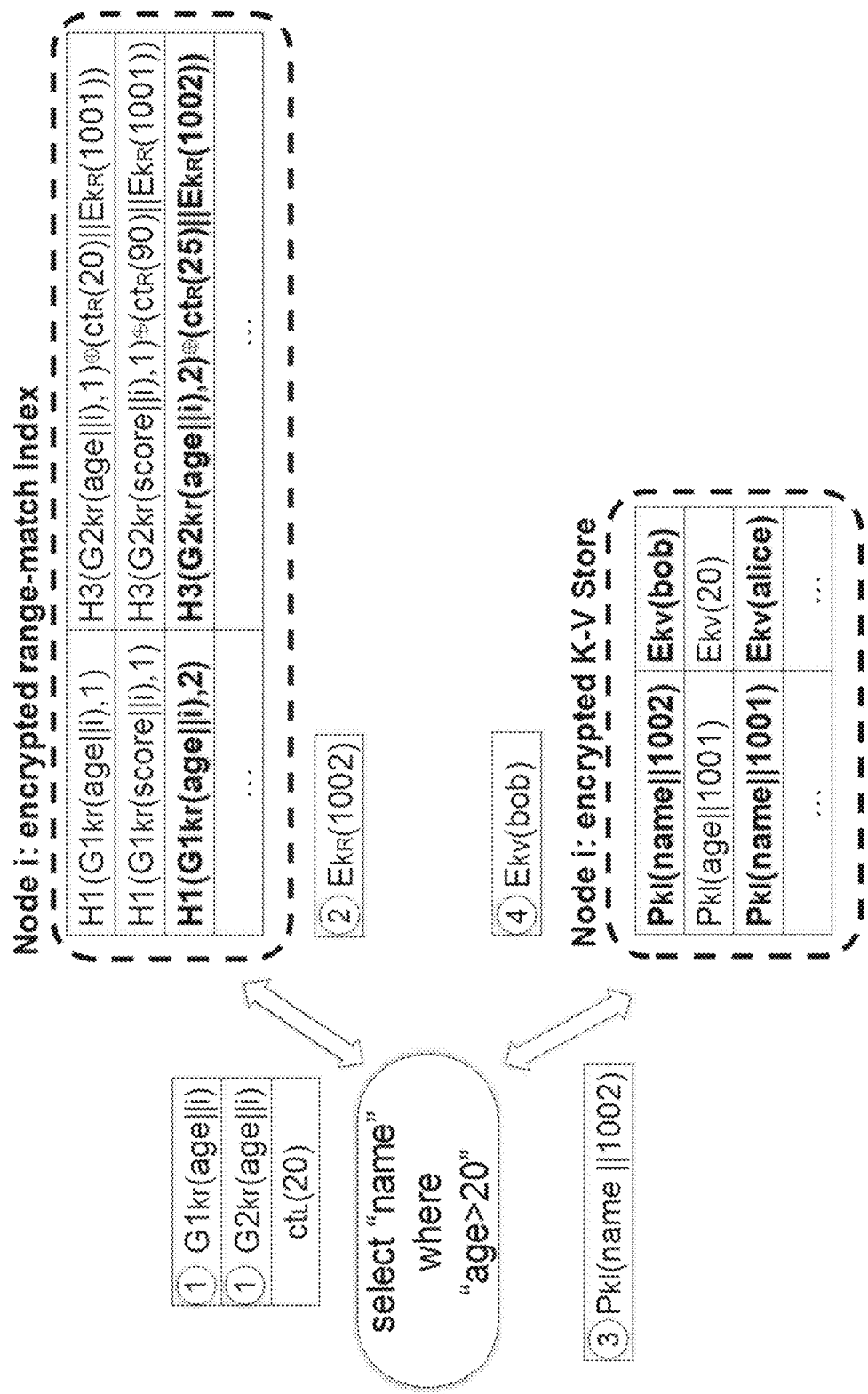
FIG. 5B illustrates the operation of a secure query protocol for a range match query in accordance with one embodiment of the present invention.

Range and Like queries: In terms of range-match queries such as the example "SELECT name WHERE age>20" in FIG. 5B. The client first generates tokens $t_1=G1(k_r,age\|i)$, $t_2=G2(k_r,age\|i)$ with ORE ciphertext of $ct_L(20)$ containing randomized ">". Each node scans index entries via $H1(t_1,c_i)$ with incremented $c_i$, and gets $ct_R$ by XORing $H3(t_2,c_i)$ with entries. Then, the node i returns the encrypted recorded identifier $(Enc(k_R,1002))$ to the client as $ORE_{cmp}(ct_L(20), ct_R)$ algorithm outputs true. Finally, the client fetches the result value $(E(k_v,bob))$ via label $P(k_f,name\|1002)$.

Preferably, EncKV also supports LIKE (aka prefix) query which is a common query operation. For instance, the query "SELECT City WHERE City LIKE 'A %'" obtains answers like "Argentina" or "Australia" and so on. The adopted ORE scheme in one embodiment of the present invention supports comparison in both numeric numbers and alphanumeric strings. Recall that each ORE ciphertext is encrypted by blocks, and previous block content is also embedded in current block ciphertext for prefix matching. During the comparison, the first different blocks between $ct_L$ and $ct_R$ will tell that their previous blocks are the same.

Join Queries: EncKV in one embodiment of the present invention supports Join queries such that any attributes of two tables can be joined together. First, define a generic join query statement, FROM $T_1$ JOIN $T_2$ ON $T_1.C_1=T_2.C_2$ WHERE field, where $T_1$ and $T_2$ are two tables being joined, $C_1$ and $C_2$ are attributes of $T_1$ and $T_2$, and field is a join condition such as an exact-match or range match operation. For example, given a query "SELECT $T_2$.GPA from $T_1$ JOIN $T_2$ on $T_1.id=T_2.id$ where $T_1.age>20$", the client first parses the query and performs "SELECT $T_1$.id from $T_1$ WHERE $T_1.age>20$" via the range-match indexes, which derives the matched record identifier set R. Then, the client generates label $P(k_f,T_2.GPA\|R_i)_{R_i \in R}$ to get final results.

Sum and Average queries: Following the treatment in prior encrypted databases, nodes in EncKV can perform aggregation on encrypted data values by using addictive homomorphic encryption (HOM) scheme as illustrated in, for example, R. A. Popa et al. *CryptDB: protecting confidentiality with encrypted query processing. In Proc. ACM SOSP,* 2011. Values to be aggregated are encrypted via a certain HOM encryption scheme, i.e., $(P(k_f,C\|R\|HOM), HEnc(k_v,v))$. When the client issues a query in the form "SELECT SUM(score) FROM Score WHERE age>20", it firstly queries the matched record identifier set R via the range-match indexes from "SELECT stu_ID FROM Score WHERE age>20". Then each node locates and aggregates the HOM ciphertext via label $\{P(k_f,score\|R_s\|HOM)\}_{R_s \in R}$. This procedure can be performed in parallel under the local index framework in one embodiment of the present invention. Finally, each node returns intermediate results to the client for final aggregation. And the average value can further be computed at the client side.

Group By queries: In one embodiment, EncKV performs Group By queries via combining exact-match queries with aggregation computation. Suppose the client issues a group by request as "SELECT city, sum(age) GROUP BY city". It firstly finds the specific record identifier set R for each group such as "LA" via the exact-match query "SELECT stu_ID where city=LA". Here, it is assumed that the client knows all the distinct city names. Then it can use the HOM label $\{P(k_f,age\|R_i\|HOM)\}_{n_i \in R}$ to ask the corresponding nodes to compute the aggregation of age values which associates "LA". Aggregation results will also be finalized at the client just like Sum queries. For other group entries, the same treatment applies.

Max and Min queries: To support Max and Min queries, the client inserts a specific LV pairs for the MAX/MIN data values on a column attribute. Using maximum value as an example, if the maximum value of the attribute "age" is "100", the client generates LV pair: $\langle P(k_f,age\|MAX),E(k_v,100)\rangle$. When the client wants to query the maximum data, it computes the label $P(k_f,age\|MAX)$ to get the maximum value. The above also applies to minimum value.

Batch Queries

In one embodiment, the query protocols of EncKV across different attributes are conducted in two phases. The first phase is to find the encrypted record identifiers that match the query condition on a specific query attribute, and the second phase is to fetch the values of these matched records on a targeted attribute. Such queries will let the nodes to know the associations (e.g., schema) between index entries of different attributes and values of the same records.

To reduce the above leakage, in a preferred embodiment the queries are conducted in two rounds of interaction, i.e., in a batched manner. For a batch of queries, the client can first parse the query conditions in a way that the overlapped or repeated query conditions will be queries only once in this batch. After receiving the encrypted result identifiers, the client decrypts them and eliminates the duplicated identifiers if any. Then the client generates the labels from distinct identifiers and the targeted attributes. In addition, the client is required to permute those labels and fetch final result values from corresponding nodes. In one example, such improvement can be realized via a dedicated query planner.

Based on the above treatment, the associations between values and index entries on same records can be better protected.

Secure Update Operations

In one embodiment, EncKV provides two ways of updating operations when new data record gas to be added, namely, bulk update and incremental update.

Bulk update is suitable for cases in which a large number of data records has to be added, i.e., migrating an unencrypted database to EncKV. Encrypted exact-match and range-match indexes can be built via their index building functions in Algorithm 1 and Algorithm 3 respectively.

Incremental update is suitable in cases where data records are only occasionally inserted into EncKV. As a result, new index entries need to be added to existing indexes. To implement incremental update, the state information (i.e., counters) on each indexed attribute should carefully be maintained either at the client or at the nodes in encrypted form so that the client can generate the corresponding index entries without affecting the following queries. Once the attributes are queried, the nodes will know whether the newly inserted index entries are associated with those attributes.

Security Analysis

Security on Exact-Match Queries

Since the secure exact-match queries of EncKV are realized in the framework of SSE, the nodes will only learn the controlled leakage and will never learn the underlying contents of queries and results. Basically, the index size will be learned once the index is uploaded to the server. Search and access pattern will be learned along the queries, where search pattern indicates the repeated queries, and access pattern indicates the accessed ciphertexts. In targeted queries which contain multiple query attributes, and thus access pattern also includes the associations between values across those attributes. Following the notion of SSE, in one example, define the leakage functions in EncKV as follows:

$$\mathcal{L}_1^{ext}(C) = (\{m_i\}_n, \langle |\alpha|, |\beta| \rangle)$$

where C is the set of secondary attributes, $m_i$ is the size of local index $I_i^{ext}$ of node i, n is the number of nodes, and $|\alpha|$, $|\beta|$ are the lengths of label and value in the index entry.

$$L_2^{ext}(v_c, C_v, C_r) = (\{t_1^i, t_j^j\}_n, \{\{\langle \alpha, \beta \langle , \rangle l, v \rangle\}_{c_1}\}_n)$$

where $v_C$ is the query value, $C_v$ is the attribute of $v_C$, $C_r$ is the attribute of result values, and $\{t_1^i, t_2^i\}_n$ are tokens for n nodes respectively. Given a query, the matched index entries and results $\{\langle \alpha, \beta \langle , \rangle l, v \rangle\}_{c_1}$ at each node are known.

$$L_3^{ext}(Q) = (M_{q \times q}, T_{v^* \to \alpha}),$$

where Q is q number of adaptive queries, and $M_{q \times q}$ is a symmetric bit matrix to trace the same queries. $M_{i,j}$ and $M_{j,i}$ are equal to 1 if $t_1^i = t_1^j$ for $i,j \in [1,q]$. Otherwise, they are equal to 0. $T_{v^* \to \alpha}$ is an inverted list that traces index entries that match each result value, which can also be referred to as inference information. For each posting list $v^*|\{\alpha_1, \ldots, \alpha_a\}$ in T, the associations between the index entries of different attributes and the result value are learned.

In terms of the quantified leakage, the security definition of exact-match queries is presented as:

Definition 1. Let Ext=(K Gen,Build$_{ext}$,Query$_{ext}$) be the encrypted exact-match index construction in EncKV. Given leakage $L_1^{ext}, L_2^{ext}$ and $L_3^{ext}$, and a probabilistic polynomial time (PPT) adversary A and a PPT simulator S, define the following experiments.

Real$_A$(k): The client calls K Gen($1^k$) to output a private key K. A selects a dataset D and asks the client to build $\{I_1^{ext}, \ldots, I_n^{ext}\}$ via Build$_{ext}$. Then A performs a polynomial number of q adaptive queries, and asks the client for tokens and ciphertexts. Finally, A outputs a bit.

Ideal$_{A,S}$(k): A selects D. S generates $\{I_1^{lext}, \ldots, I_n^{lext}\}$ for A based on $\mathcal{L}_1^{ext}$. A performs a polynomial number of adaptive q queries. From $\mathcal{L}_2^{ext}$ and $\mathcal{L}_3^{ext}$, S returns the simulated ciphertexts and tokens. Finally, A outputs a bit.

Ext is adaptively secure with ($\mathcal{L}_1^{ext}, \mathcal{L}_2^{ext}$ and $\mathcal{L}_3^{ext}$) if for all PPT adversaries A, there exists a simulator S such that $Pr[Real_A(k)=1]-Pr[Ideal_{A,S}(k)=1] \leq negl(k)$, where negl(k) is a negligible function in k.

Theorem 1. Ext is adaptively secure with ($\mathcal{L}_1^{ext}, \mathcal{L}_2^{ext}$ and $\mathcal{L}_3^{ext}$) under the random-oracle model if G1, G2, H1, H2, P are secure PRF.

The security notion of exact-match queries in EncKV is stronger than deterministic encryption (DET) used in existing encrypted databases. DET-based designs expose the server all the same values on an attribute, while EncKV in the present embodiment will not disclose such information. For other auxiliary information, associations between values across attributes (aka inter-column and intra-column associations) are directly exposed in existing encrypted databases with legacy compatibility, while the exposure of such information in EncKV of the present embodiment is greatly reduced. On the one hand, the attribute is secretly embedded in the encrypted index, the server will never learn whether two tokens query the values on the same attribute or not. On the other hand, the batch query mechanism in EncKV of the present embodiment further reduces the associations between columns.

Security on Range-Match Queries

The secure range-match queries in EncKV in the present embodiment are improved based on the ORE scheme proposed in K Lewi and D. J. Wu. *Order-Revealing Encryption: New Constructions, Applications, and Lower Bounds. In Proc. ACM CCS,* 2016. Therefore, the security in the present embodiment achieves at least the same level as the scheme in K. Lewi and D. J. Wu. *Order-Revealing Encryption: New Constructions, Applications, and Lower Bounds. In Proc. ACM CCS,* 2016. That is, briefly, the ciphertexts are semantically secure, and the first different block that differs between two values in the comparison. To achieve general protection and integrate the indexes into the local index framework, EncKV leverages SSE techniques as an overlay to protect ORE ciphertexts in the encrypted indexes. Yet, similar to exact-match queries, inference information will also be learned since queries may involve multiple query attributes. Accordingly, the leakage functions are defined as follows:

$$\mathcal{L}_1^{rng}(c) = (\{m_i\}_n, \langle |\alpha|, |\beta| \rangle)$$

where C is the set of secondary attributes, $m_i$ is the size of local index $I_1^{rng}$ of node i, n is the number of nodes, and $|\alpha|$, $|\beta|$ are the lengths of label and value in the index entry.

$$\mathcal{L}_2^{rng}(v_C, C_v, C_r) = (\{t_1^i, t_2^i\}_n, ct_L, \{\{\langle \alpha, \beta \langle , \rangle l, v \rangle\}_{c_j}\}_n)$$

where $v_C$ is the query value, $C_v$ is the query attribute, $C_r$ is the attribute of result value, $ct_L$ is the token for ORE comparison, and $\{t_1^i, t_2^i\}_n$ are tokens for n nodes respectively. Given a query, the matched index entries and result pairs $\{\langle \alpha, \beta \langle , \rangle l, v^* \rangle\}_c^i$, at each server node are known. In addition, the rest of index entries on this column will also be learned.

$$L_3^{rng}(v_c, cmp) = (\{\{b_{dif}\}c_i\}_n)$$

where $b_{dif}$ is the first block that differs in the comparison of matched ORE ciphertexts.

$$L_4^{rng}(Q) = (M_{q \times q}, T_{v^* \to \alpha})$$

where Q is q number of adaptive queries, and $M_{q \times q}$ is a symmetric bit matrix to trace the same queries. $M_{i,j}$ and $M_{j,i}$ are equal to 1 if $t_1^i$, $t_1^j$ for $i,j \in [1,q]$. Otherwise, they are equal to 0. $T_{v^* \to \alpha}$ is an inverted list that indicates the associations between the index entries of different attributes and the result values as defined in exact-match queries. Accordingly, the security definition of range-match queries can be presented as follows:

Definition 2. Let Rng=(KGen, Build$_{rng}$,Query$_{rng}$) be the encrypted exact-match index construction of EncKV. Given leakage $\mathcal{L}_1^{rng}$, $\mathcal{L}_2^{rng}$, $\mathcal{L}_3^{rng}$ and $L_4^{rng}$, and a PPT adversary A and a PPT simulator S, define the following experiments.

RealA(k): The client calls KGen($1^k$) to output a private key K. A selects a dataset D and asks the client to build$\{I_1^{rng}, \ldots, I_n^{rng}\}$ via Build$_{rng}$. Then A performs a polynomial number of q adaptive queries, and asks the client for tokens and ciphertexts. Finally, A outputs a bit.

IdealA;S(k): A selects D. S generates $\{I_1^{lrng}, \ldots, I_n^{lrng}\}$ for A based on $\mathcal{L}_1^{rng}$. A performs a polynomial number of non-adaptive q queries. From $\mathcal{L}_2^{rng}$, $\mathcal{L}_3^{rng}$, and $L_4^{rng}$, S returns the simulated ciphertexts and tokens. Finally, A outputs a bit.

Rng is non-adaptively secure with ( $\mathcal{L}_1^{rng}$, $\mathcal{L}_2^{rng}$, $\mathcal{L}_3^{rng}$ and $\mathcal{L}_4^{rng}$) if for all PPT adversaries A, there exists a simulator S such that Pr[Real$_A$(k)=1]−Pr[Idea$_{A,S}$(k)= 1]≤negl(k), where negl(k), is a negligible function in k.

Theorem 2. Rng is non-adaptively secure with ( $\mathcal{L}_1^{rng}$, $\mathcal{L}_2^{rng}$, $\mathcal{L}_3^{rng}$, $\mathcal{L}_4^{rng}$) if G1, G2, H1, H3, P, F1, F2, F3 are secure PRF.

The enhanced ORE scheme in the present embodiment protects the order information in queries and ciphertexts even after comparison. As illustrated in line 6 of Algorithm 6, the query order is protected in the ORE query token, i.e., $q_i$=F2($k_3$,cmp$\|C\|v_{li}$), where cmp is the order, C is the query attribute, and $v_{li}$ is the ith block of query value. As a result, different query values or attributes will result in different ORE query tokens. Then $q_i$ is used by the server node to compute Q1($q_{i,c}$) in line 7 of Algorithm 5. If the output is matched with $s_i$ in the ciphertext, this entry will be considered to be matched.

Experimental Evaluation
 Prototype Implementation

To assess the performance of EncKV in the present embodiment of the invention, a prototype was implemented and deployed onto Amazon Web Services. 4 AWS M4-xlarge instances were created to operate as clients. Also created was a Redis (v3.2.0) cluster that consists of 9 AWS M4-xlarge instances as the nodes to store encrypted indexes and records. Each instance was assigned with 4 vcores (2.4 GHz Intel Xeon® E5-2676 v3 CPU), 16 GB RAM and 40 GB SSD, and Ubuntu server 14.04 are installed. The EncKV prototype utilized Apache Thrift (v0.9.2) to implement the remote procedure call (RPC).

EncKV used OpenSSL (v1.01f) for the implementation of cryptographic build blocks. Secure PRF was implemented via AES cipher (128 bits). The enhanced ORE scheme was implemented on top of the implementation of the ORE scheme in K Lewi and D. J. Wu. *Order-Revealing Encryption: New Constructions, Applications, and Lower Bounds*. In Proc. ACM CCS, 2016. In the evaluation, 8 bits were set as the block size for ORE encryption. The encrypted exact-match and range match indexes were integrated into the implementation of the distributed encrypted index framework X. In total, the EncKV in this embodiment contained about 10144 lines of C++ code.

Performance Evaluation

The evaluation on EncKV of the present embodiment mainly focuses on the encrypted index and query performance.

TABLE 1

Encrypted index space consumption

| | # Indexed values | | |
|---|---|---|---|
| | 400K | 600K | 800K |
| (a) Encrypted exact-match index | | | |
| Size (GB) | 0.012 | 0.018 | 0.024 |
| (b) Encrypted range-match index | | | |
| Size (2 bit block) (GB) | 0.209 | 0.313 | 0.417 |
| Size (4 bit block) (GB) | 0.399 | 0.599 | 0.799 |
| Size (8 bit block) (GB) | 3.070 | 4.604 | 6.139 |

Index evaluation: The index space consumption is shown in Table 1. For the encrypted exact-match index, the size of each entry <α,β> is 256 bits, where α and β are 128-bit long. Table 1(a) shows that the index size increases linearly from 0.012 GB (400K indexed values) to 0.024 GB (800K indexed values). For the encrypted range-match index, each entry also needs to store ORE ciphertext $ct_R$ for comparison. As an ORE ciphertext is encrypted by blocks, the size of $ct_R$ depends on the length of block b. And each block ciphertext contains $2^b$ sub blocks, where each is 64 bit-long (truncated from AES cipher output). With α, β, a 128-bit nonce β, and $ct_R$, the size of an entry for a 32-bit value is $128+128+64 \times 2^b \times 32/b+128$ bits. As mentioned in K. Lewi and D. J. Wu. *Order-Revealing Encryption: New Constructions, Applications, and Lower Bounds*. In Proc. ACM CCS, 2016, there is a tradeoff in security and space. The larger block size has stronger security but introducing more space cost, as shown in Table 1(b).

Figure 6A:
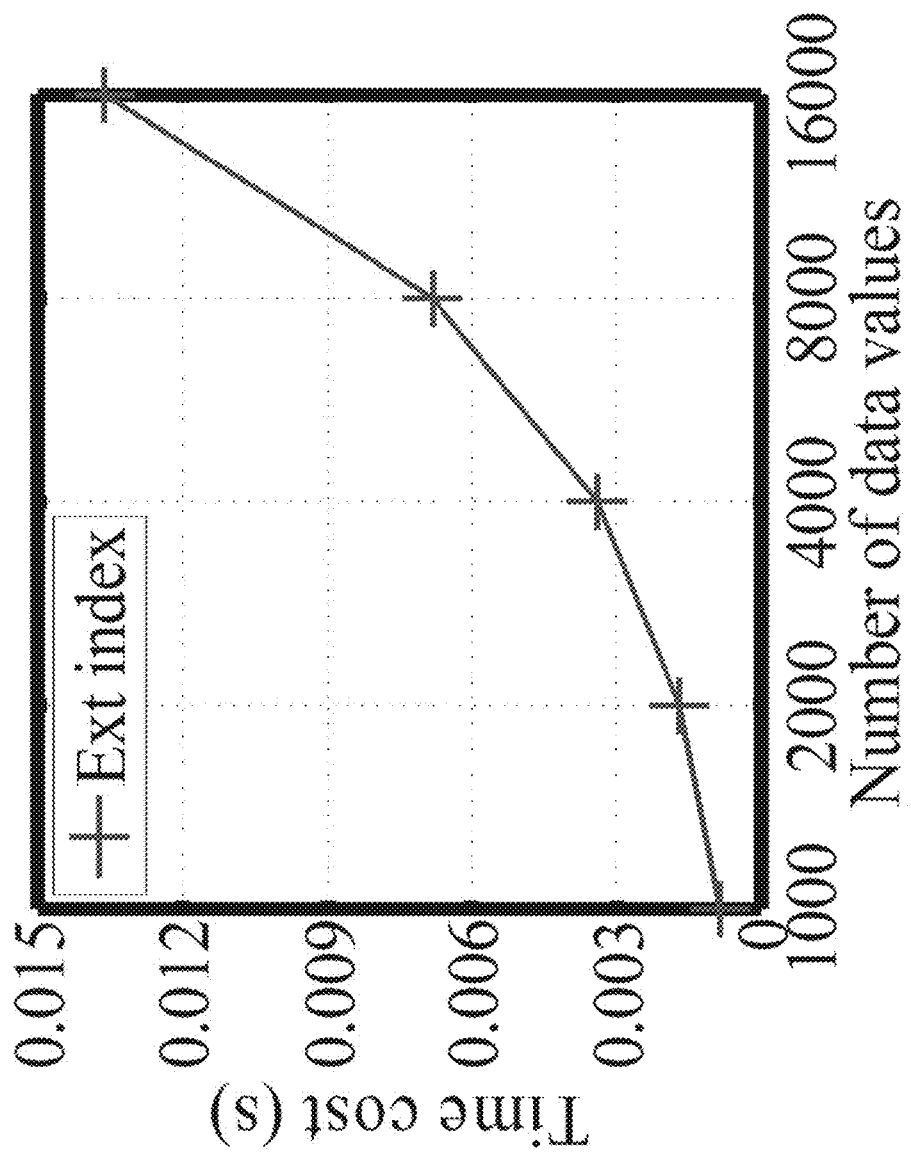
FIG. 6A is a graph showing index building time for exact match indexes in accordance with one embodiment of the present invention.
Figure 6B:
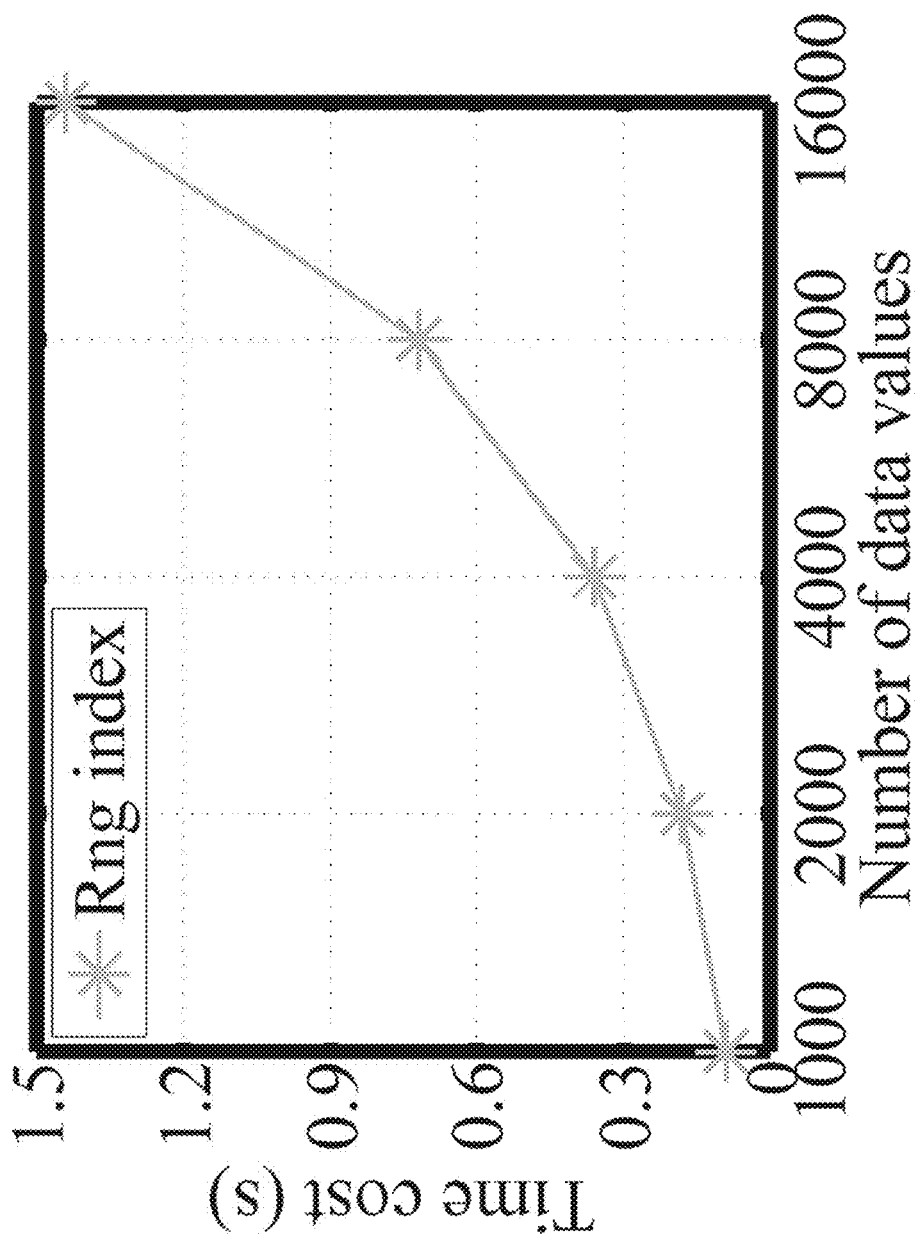
FIG. 6B is a graph showing index building time for range match indexes in accordance with one embodiment of the present invention.

FIGS. 6A and 6B show the measure of the index building time at the client for exact match indexes and range match indexes, respectively, in one embodiment of the present invention. It can be seen that both time cost increases linearly with the number of indexed values. The range-match index takes more time because it needs to generate ORE ciphertexts in addition to masking the encrypted record identifiers.

Figure 6C:
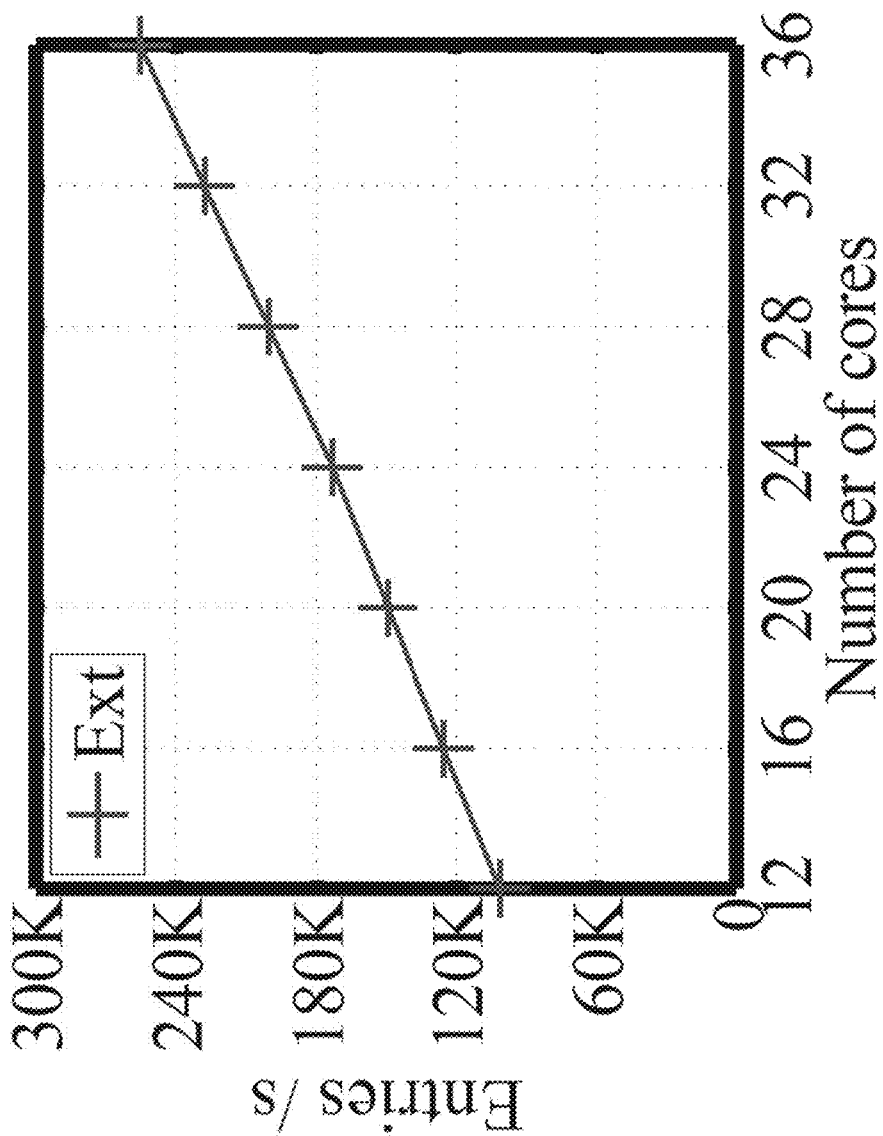
FIG. 6C is a graph showing query throughput for exact match indexes in accordance with one embodiment of the present invention.
Figure 6D:
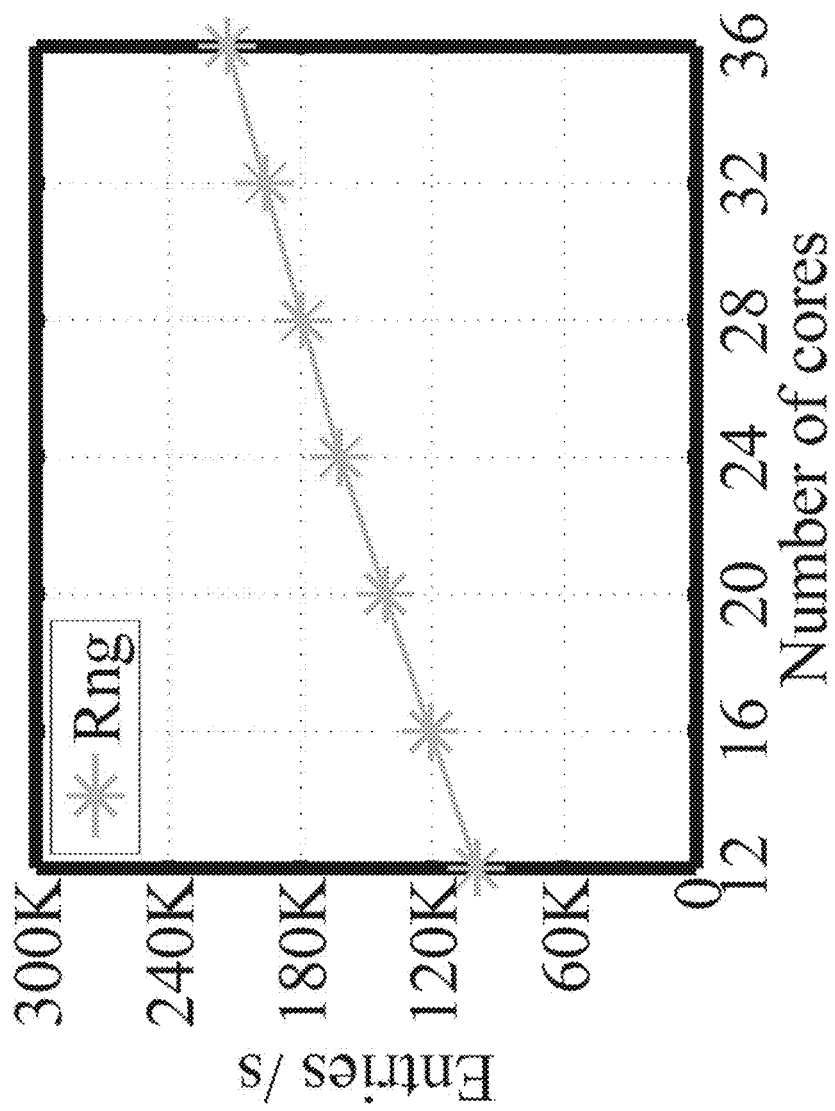
FIG. 6D is a graph showing query throughput for range match indexes in accordance with one embodiment of the present invention.

Query evaluation: To evaluate the scalability of EncKV in the present invention, the query throughput for exact match indexes and range match indexes, respectively, in one embodiment of the present invention, is evaluated, and the results are shown in FIG. 6C and FIG. 6D. It can be seen that the total number of index entries processed per second in both indexes increases with the number of cores. Specifically, it is found that the throughput of exact-match queries can achieve up to 255K entries per second in 9 nodes, while the throughput of range match queries is lower, 213K entries per second. The overhead is from the cost of PRP and PRF operations in compared blocks during the ORE comparison. These results confirmed that EncKV in the present embodiment performs satisfactorily at scale.

Figure 6E:
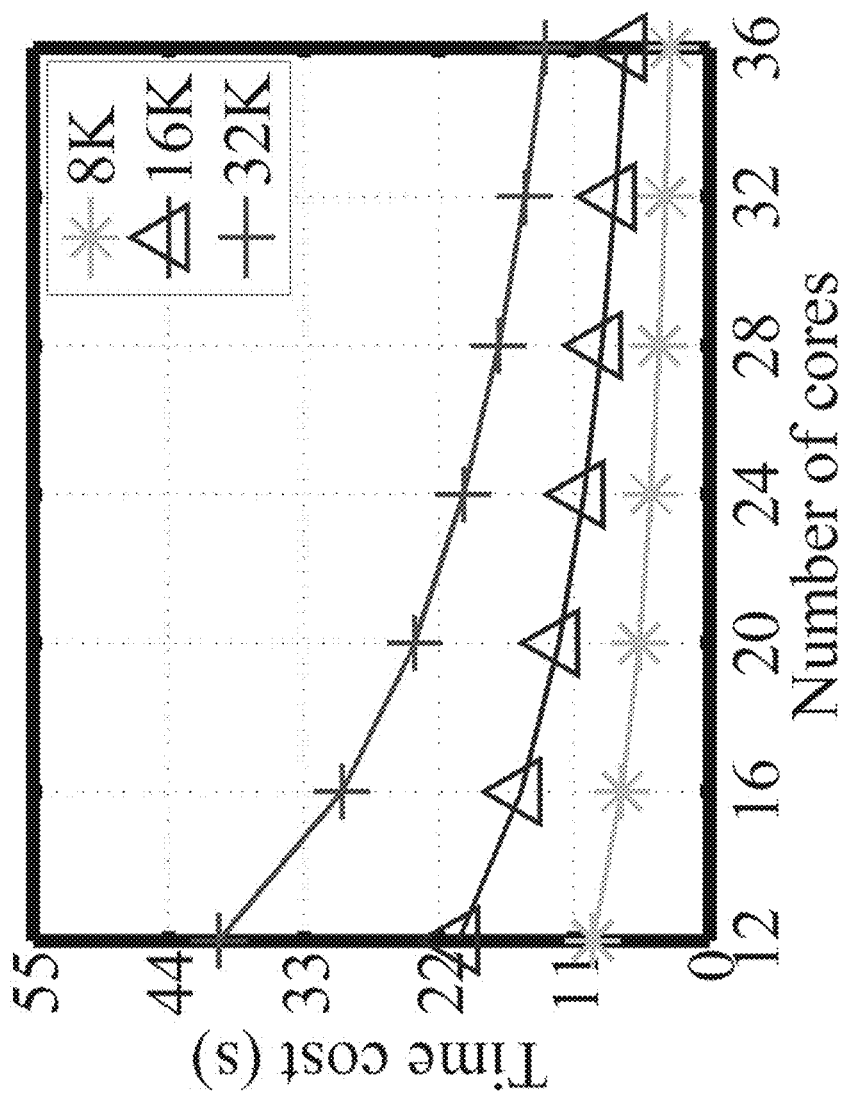
FIG. 6E is a graph showing query latency for exact match indexes in accordance with one embodiment of the present invention.

In order to gain a deeper understanding on the query performance of EncKV of the present embodiment, the latency for exact-match and range-match queries, respectively, were further evaluated. In FIG. 6E, it is shown that as the number of nodes increases, the latency of exact-match queries that return a fixed number of results is reduced dramatically in similar proportions. The latency of exact-match queries with 32 cores is roughly half of the latency with 16 cores for returning 32 K matched encrypted values. Likewise, FIG. 6G shows that the latency of range-match queries follows a similar downward trend as the number of cores increases. When the number of compared ciphertexts is 32 K, the query latency with 36 cores is around 17 s which is almost one-third of the latency with 12 cores. Thus, it can be determined that EncKV in the present embodiment benefits from the encrypted local index framework and can effectively handle queries in parallel.

Figure 6F:
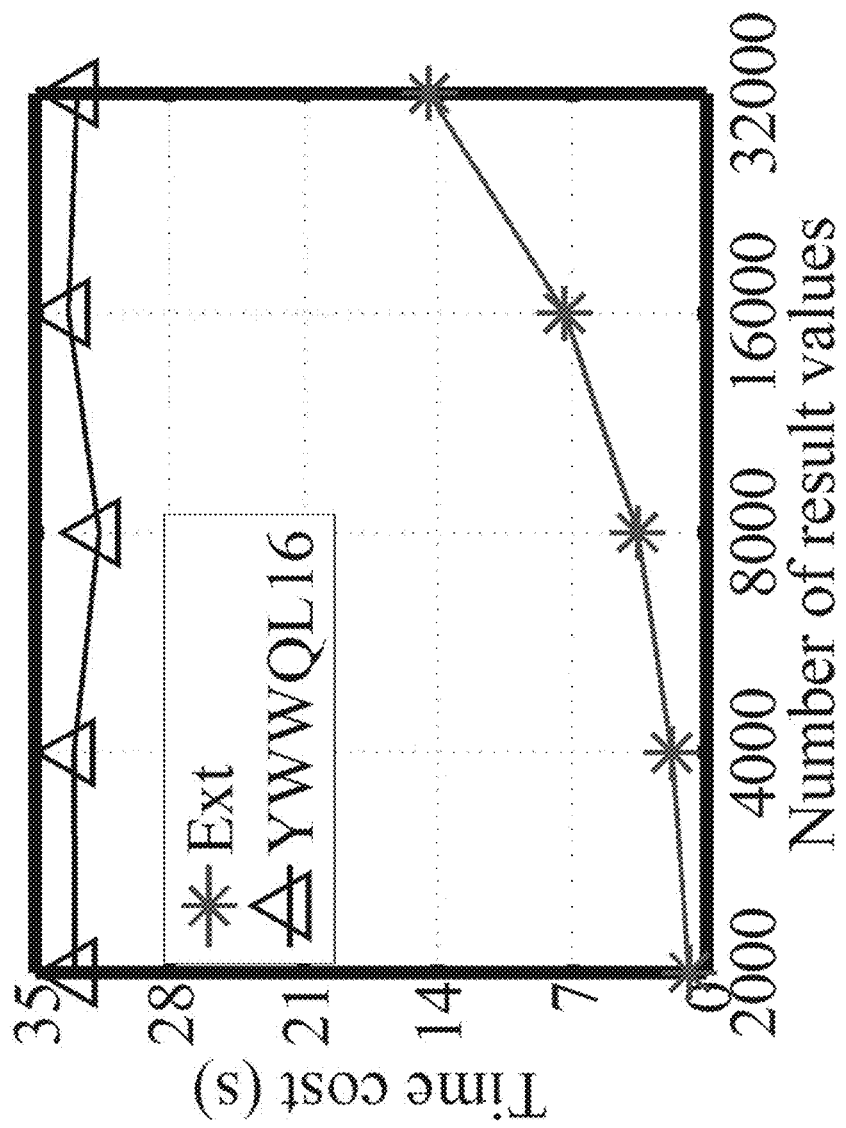
FIG. 6F is a graph comparing query for exact match indexes in accordance with one embodiment of the present invention and that of a known method.
Figure 6G:
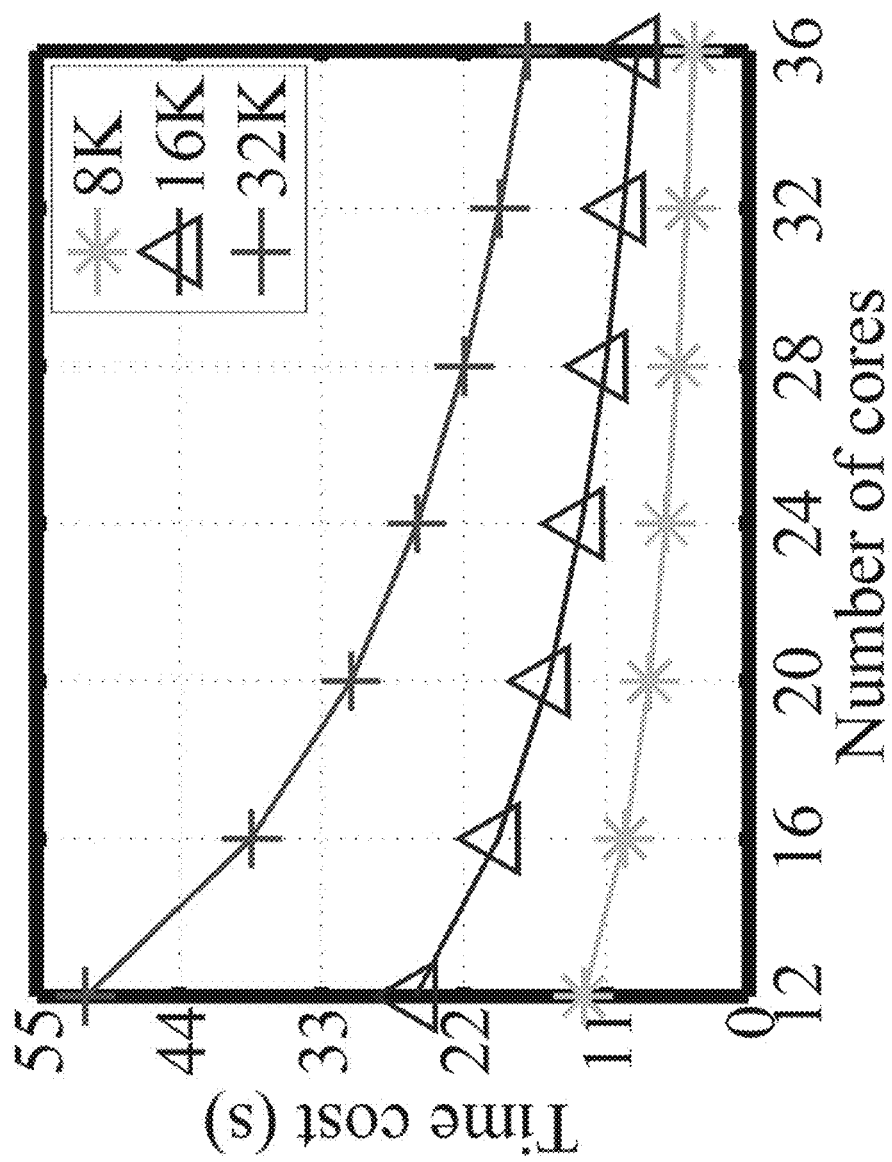
FIG. 6G is a graph showing query latency for range match indexes in accordance with one embodiment of the present invention.

FIG. 6F compares the exact-match query performance in the present embodiment with the scheme proposed in X. Yuan et al. *Building an encrypted, distributed, and searchable key-value store. In Proc. ACM AsiaCCS*, 2016 (denoted as YWWQL16), which conducts token matching by enumerating all values on a column. In this example, around 70 K records were pre-inserted for both designs. As shown, the design in the present embodiment achieves optimal time complexity, scaling in the number of matched results, while YWWQL16 scans the entire column no matter how many values are matched. Specifically, the number of matched values from 2K to 32K increases the query time from approximately 0.92 s to 14.4 s. In contrast, the query time of YWWQL16 is a constant-time operation, about 32.7 s.

Figure 6H:
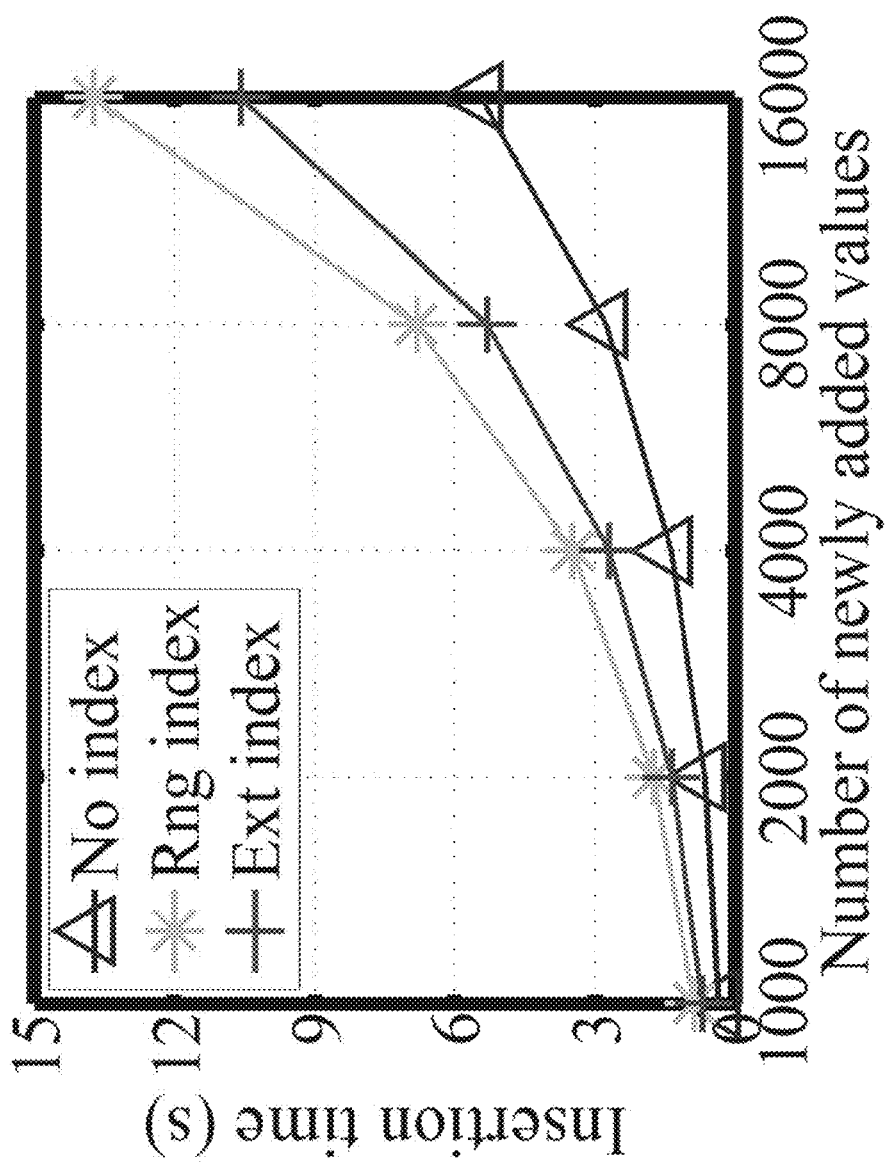
FIG. 6H is a graph showing latency caused by insertion for both exact match indexes and range match indexes in accordance with one embodiment of the present invention.

Since EncKV in the present embodiment also supports incremental updates for newly added records, the cost for index entry insertion in the present embodiment is evaluated in FIG. 6H. The comparison result in FIG. 6H shows that inserting new records into both encrypted indexes will not introduce too much overhead compared to the case without indexing. Note that such cost includes network transmission for each new indexed value, and thus it is much higher than the index building cost (bulk update). For 1000 values, it takes 0.686 s and 0.875 s to index entries for exact-match and range-match indexes respectively.

Figure 7A:
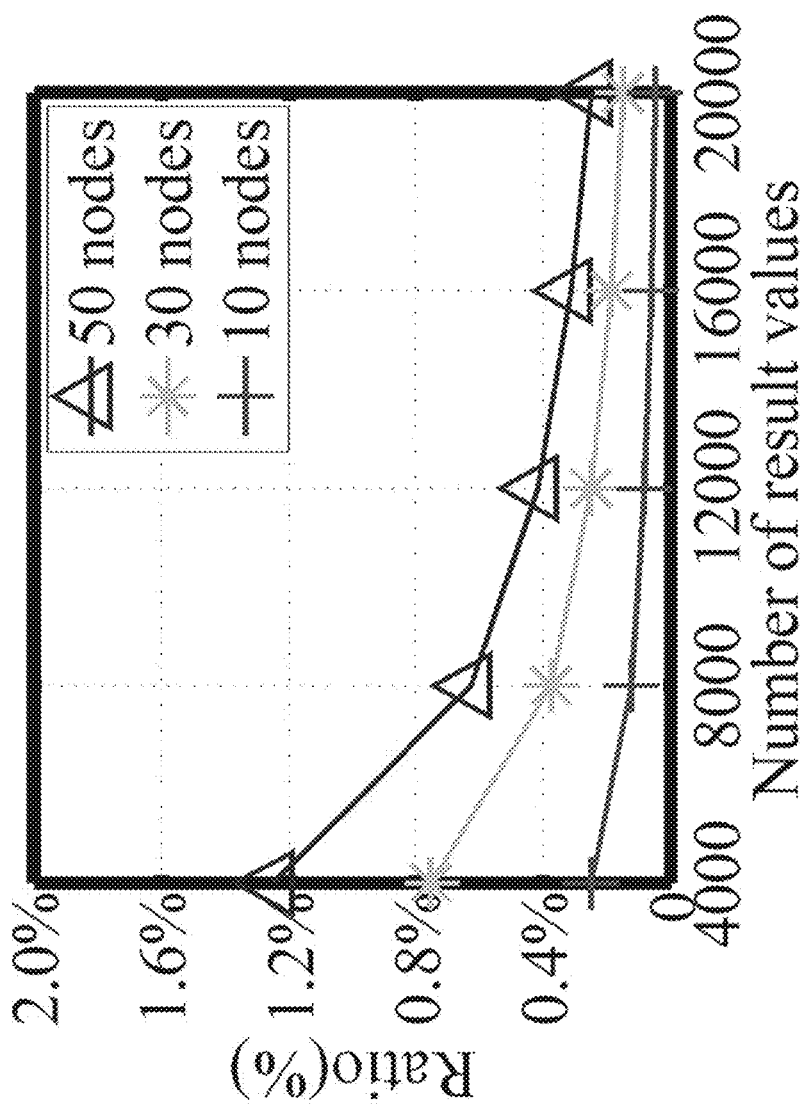
FIG. 7A is a graph showing query token bandwidth overhead for exact match indexes in accordance with one embodiment of the present invention.
Figure 7B:
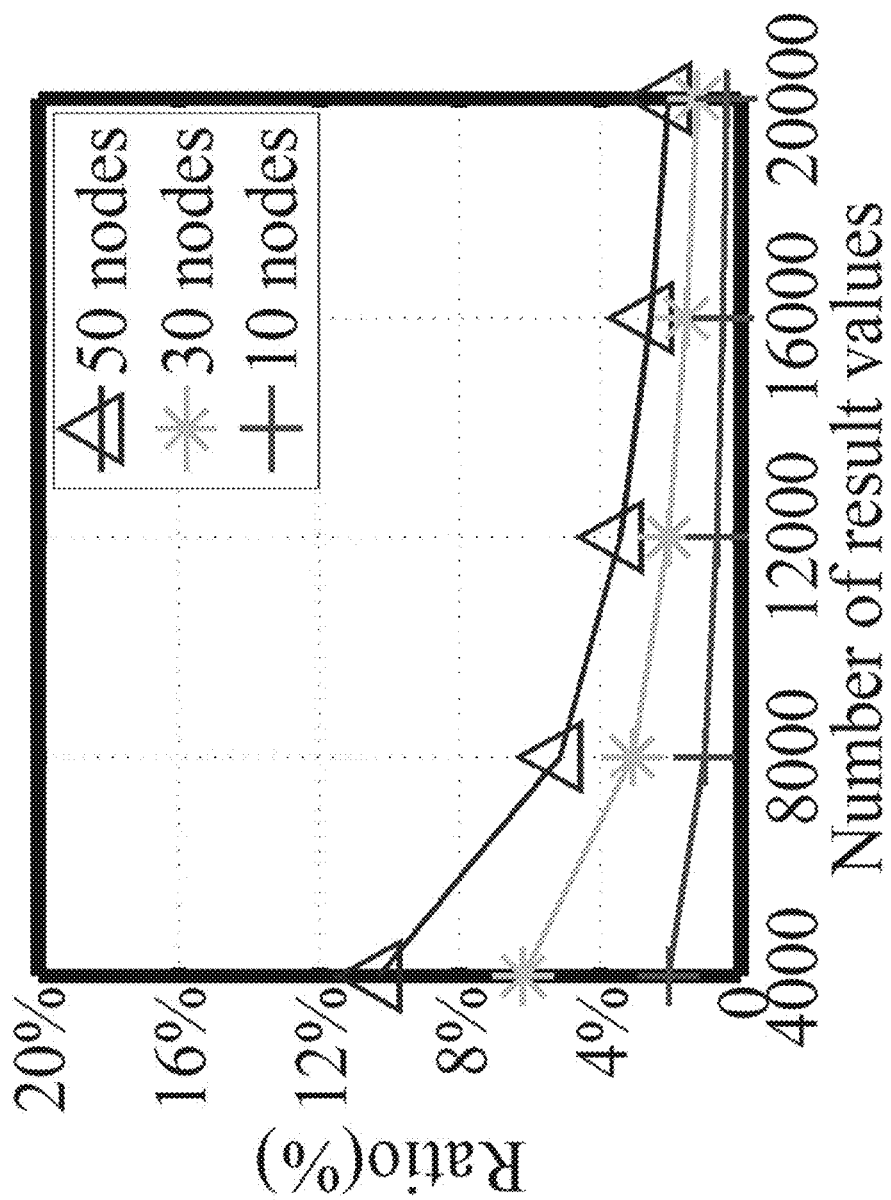
FIG. 7B is a graph showing query token bandwidth overhead for range match indexes in accordance with one embodiment of the present invention.

The adopted local index framework in the present embodiment requires the client to generate query tokens for each node. To understand the bandwidth overhead, the ratio between the query token size and the result size is shown in FIGS. 7A and 7B. The result from FIG. 7A indicates that the ratio of exact-match query decreases gradually with the increased size of results. Specifically, the ratio for 50 nodes drops from about 1:25% to approximately 0:25% when the number of retrieved result values increases from 4K to 20K. On the other hand, it is found that the increasing number of nodes can render a rise in the bandwidth. The ratio of 8K result size increases from around 0:13% to about 0:63% when the number of nodes rises from 10 to 50. Nevertheless, the bandwidth overhead of query tokens is negligible to the size of results. The range-match queries follow a similar trend as provided in FIG. 7B, but the corresponding ratio is higher than the exact-match queries. The reason may be that the range query token contains an additional ORE ciphertext $ct_L$ to perform ORE comparison, which enlarges the size of the query token. As shown, the ratio reaches 10:3% for 50 nodes to return 4K results.

System

Figure 8:
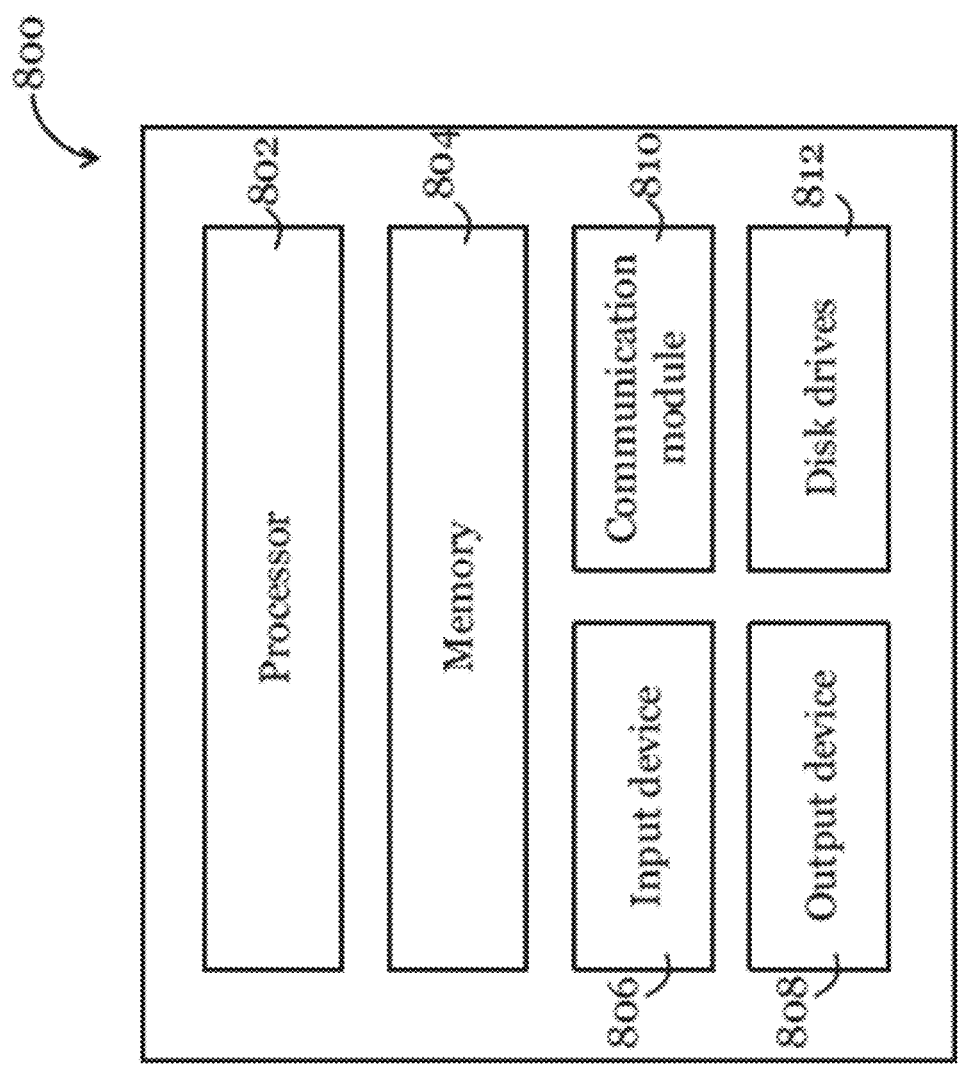
FIG. 8 is block diagram of an information handling system that is adapted to perform the method of FIG. 2.

Referring to FIG. 8, there is shown a schematic diagram of an exemplary information handling system 800 that can be used for operating the method of the present invention. Preferably, the information handling system 800 may have different configurations, and it generally comprises suitable components necessary to receive, store and execute appropriate computer instructions or codes. The main components of the information handling system 800 are a processing unit 802 and a memory unit 804. The processing unit 802 is a processor such as a CPU, an MCU, etc. The memory unit 804 may include a volatile memory unit (such as RAM), a non-volatile unit (such as ROM, EPROM, EEPROM and flash memory) or both. Preferably, the information handling system 800 further includes one or more input devices 806 such as a keyboard, a mouse, a stylus, a microphone, a tactile input device (e.g., touch sensitive screen) and a video input device (e.g., camera). The information handling system 800 may further include one or more output devices 808 such as one or more displays, speakers, disk drives, and printers. The displays may be a liquid crystal display, a light emitting display or any other suitable display that may or may not be touch sensitive. The information handling system 800 may further include one or more disk drives 812 which may encompass solid state drives, hard disk drives, optical drives and/or magnetic tape drives. A suitable operating system may be installed in the information handling system 800, e.g., on the disk drive 812 or in the memory unit 804 of the information handling system 800. The memory unit 804 and the disk drive 812 may be operated by the processing unit 802. The information handling system 800 also preferably includes a communication module 810 for establishing one or more communication links (not shown) with one or more other computing devices such as a server, personal computers, terminals, wireless or handheld computing devices. The communication module 810 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 802, the memory unit 804, and optionally the input devices 806, the output devices 808, the communication module 810 and the disk drives 812 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the information handling system 800 shown in FIG. 8 is merely exemplary, and that different information handling systems 800 may have different configurations and still be applicable in the present invention. In one embodiment the method of the present invention may at least partly be operated in the server node 104A-104F formed by one or more servers, using hardware or software or both, in the system 100 of EncKV, or at least partly be operated in the client device 102 in the system 100 of EncKV. Such one or more server nodes and client device may contain the same or similar functional components as the information handling system 800.

Conclusion

The above embodiments of the present invention provides EncKV, an encrypted key-value store with secure rich query support. To support exact match queries (keyword search, equality test, counting, and enumeration) and range match queries (range search and prefix match), EncKV in the above embodiments leverages two primitives: searchable symmetric encryption (SSE) and order-revealing encryption (ORE). For high performance queries, EncKV in one embodiment follows the guideline of the encrypted local index framework proposed in X. Yuan et al. *Building an encrypted, distributed, and searchable key-value store. In Proc. ACM AsiaCCS*, 2016; that is, the client needs to know the location of each data record so that it can build the local encrypted indexes that index the data records on each node respectively. This requirement naturally demands EncKV to inherit the secure data partition algorithm, which allows the client to track the locations of encrypted data records.

In one embodiment for exact-match queries, EncKV carefully integrates an efficient SSE scheme into its local index framework, with customization and improvements made to support exact-match queries via encrypted single or multiple secondary attributes of data. As a result, the encrypted local indexes of EncKV has at least the same level of security as SSE, and can readily be stored in any KV store back end for easy deployment.

For range-match queries, EncKV is developed based on an ORE scheme, which achieves the "best-possible" security notion for ORE. Similarly, the ORE scheme is heavily customized, improved, and then integrated into the index framework of EncKV.

Advantageously, in some embodiments, EncKV further reduces the leakage during ciphertext comparisons by randomizing the query order (i.e., ">" and "<"). Accordingly, the servers will not know whether the matched results are greater or smaller than the query values.

EncKV introduces an interactive batch query mechanism to reduce the leakage of data correlations on different attributes. EncKV of the present invention provides, among other things, the following technical advantages:

It supports multiple data models in a secure manner. Data records with multiple attributes are randomly mapped into encrypted key-value pairs, and stored to nodes via a standard data partitioning algorithm.

It supports rich query functions over encrypted data records in distributed KV stores. The supported queries include keyword search, equality, count, join, range, like, sum, average, group by, max, and min.

It offers guaranteed security, i.e., security notion of SSE for exact-match queries, and security notion of ORE for range-match queries.

It provides two mechanisms for indexing: a bulk update mechanism to build indexes for a set of data records, as well as an incremental update mechanism to insert individual index entries for newly added records.

It preserves linear scalability of distributed data stores with respect to their performance. The throughput of processing encrypted indexes increases linearly with the number of nodes in the cluster. By facilitating query processing in parallel with its local index framework, the query latency is reduced when more nodes are added.

Other advantages of the present invention will become apparent to the person skilled in the art upon referring to the description and the appended drawings.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for operating a NoSQL database with distributed key-value store, comprising:
   (a) processing a data set comprised of data records, each of the data records having a unique identifier and including a respective value associated with one or more attributes using a private key provided at a client;
   (b) partitioning the data records based on the identifier and forming a plurality of encrypted identifier-value pairs for distributed storage across a plurality of servers operably connected to the client device;
   (c) storing the encrypted identifier-value pairs at the servers, wherein the distribution of the encrypted identifier-value pairs to the servers based on a consistent hashing ring maintained at the client device and which indicates a range of identifiers associated with each of the servers;
   (d) building, at the client device, encrypted indexes for the encrypted identifier-value pairs;
   (e) storing, at the servers, the respective built encrypted indexes, wherein each server stores local indexes associated with the local encrypted identifier-value pairs and not with encrypted identifier-value pairs in other servers;
   (f) executing a query protocol in response to receiving a query from the client device so as to identify, using the built encrypted indexes, data distributively stored in the servers and which matches the query, wherein the execution comprises:
   generating, at the client device, a token set including a plurality of tokens based on a condition attribute of the query;
   transmitting the token set to each of the servers;
   processing the tokens at each of the servers using local indexes associated with each respective server;
   providing one or more encrypted identifiers of encrypted matched record to the client device;
   decrypting, at the client device, the one or more encrypted identifiers; and
   generating, at the client device, labels for obtaining the matched record.

2. The method of claim 1, wherein the encrypted indexes are exact-match indexes which index the identifiers which respectively matches a same value for a corresponding attribute.

3. The method of claim 2, wherein step (b) comprises tracking the values and recording a count for each of the values on the servers.

4. The method of claim 2, wherein step (b) utilizes a searchable symmetric encryption method.

5. The method of claim 1, further comprising storing the encrypted indexes at the client device.

6. The method of claim 1, wherein the encrypted indexes are range-match indexes.

7. The method of claim 6, wherein step (b) comprises tracking the values, recording a count for each of the values on the servers, and tracking order information of the values.

8. The method of claim 7, wherein the order information is randomized.

9. The method of claim 7, wherein
the token set further includes a token containing encrypted order information.

10. The method of claim 1, wherein the identifiers are stored in the form of ciphertext at the client device.

11. The method of claim 1, wherein the identifiers are stored in the form of ciphertext in the plurality of servers.

12. The method of claim 1, further comprising inserting dummy identifier-value pairs into the plurality of servers.

13. The method of claim 1, wherein step (c) is performed in at least two batches for the data distributively stored in the servers.

14. The method of claim 1, wherein the servers are arranged in a cloud computing network.

15. A system for operating a NoSQL database with distributed key-value store, comprising:
a client device with a processor and a memory, configured to:
process a data set comprised of data records, each of the data records having a unique identifier and including a respective value associated with one or more attributes using a private key provided at the client device;
partition the data records based on the identifier and form a plurality of encrypted identifier-value pairs for distributed storage across a plurality of servers operably connected to the client device; and
build encrypted indexes for the encrypted identifier-value pairs;
a plurality of servers each having a processor and a memory, configured to:
store the encrypted identifier-value pairs, wherein the encrypted identifier-value pairs are distributively stored at the servers based on a consistent hashing ring maintained at the client device and which indicates a range of identifiers associated with each of the servers;
store the respective built encrypted indexes; wherein each server stores indexes associated with the local encrypted identifier-value pairs and not with encrypted identifier-value pairs in other servers;
wherein the client device and the servers are arranged to execute a query protocol in response to receiving a query from the client device so as to identify, using the built encrypted indexes, data distributively stored in the servers and which matches the query,
wherein the client device is arranged to:
generate a token set including a plurality of tokens based on a condition attribute of the query;
transmit the token set to each of the servers;

decrypt one or more encrypted identifiers of encrypted matched record provided from the servers; and
generate labels for obtaining the matched record; and
wherein each of the servers are arranged to:
process the tokens using local indexes associated with each respective server; and provide one or more encrypted identifiers of encrypted matched record to the client device.

16. The system of claim 15, wherein the encrypted indexes are exact-match indexes which index the identifiers which respectively matches a same value for a corresponding attribute.

17. The system of claim 15, wherein the encrypted indexes are range-match indexes.

18. An apparatus for operating a NoSQL database with distributed key-value store, comprising a processor and a memory, operably connected with a plurality of servers, the apparatus being configured to:
process a data set comprised of data records, each of the data records having a unique identifier and including a respective value associated with one or more attributes using a private key provided at the client device, wherein the encrypted identifier-value pairs are distributively stored at the servers based on a consistent hashing ring maintained at the client device and which indicates a range of identifiers associated with each of the servers;
partition the data records based on the identifier and form a plurality of encrypted identifier-value pairs for distributed storage across a plurality of servers operably connected to the client device; and
build encrypted indexes for the encrypted identifier-value pairs for storage at the servers, wherein each server stores indexes associated with the local encrypted identifier-value pairs and not with encrypted identifier-value pairs in other servers;
wherein the client device is arranged to cooperate with the servers to execute a query protocol in response to receiving a query from the client device so as to identify, using the build encrypted indexes, data distributively stored in the servers and which matches the query,
wherein the client device is arranged to:
generate a token set including a plurality of tokens based on a condition attribute of the query;
transmit the token set to each of the servers for processing at the servers using local indexes associated with each respective server;
decrypt one or more encrypted identifiers of encrypted matched record provided from the servers; and
generate labels for obtaining the matched record.

* * * * *